(12) United States Patent
Hirasawa

(10) Patent No.: US 8,345,086 B2
(45) Date of Patent: Jan. 1, 2013

(54) APPARATUS, METHOD, AND COMPUTER PROGRAM FOR ANALYZING IMAGE DATA

(75) Inventor: Yasutaka Hirasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 627 days.

(21) Appl. No.: 12/555,691

(22) Filed: Sep. 8, 2009

(65) Prior Publication Data
US 2010/0060720 A1 Mar. 11, 2010

(30) Foreign Application Priority Data

Sep. 9, 2008 (JP) ................................ P2008-231181

(51) Int. Cl.
*H04N 13/02* (2006.01)
(52) U.S. Cl. ........................................................ 348/49
(58) Field of Classification Search .............. 348/42–60; 382/184–185; 375/240.16; 359/462–464
See application file for complete search history.

(56) References Cited

U.S. PATENT DOCUMENTS

| | | | |
|---|---|---|---|
| 5,717,415 A | 2/1998 | Iue et al. | |
| 5,929,859 A * | 7/1999 | Meijers | 345/419 |
| 6,445,833 B1 | 9/2002 | Murata et al. | |
| 6,448,952 B1 * | 9/2002 | Toyoda et al. | 345/97 |
| 6,466,255 B1 | 10/2002 | Kagita et al. | |
| 6,553,184 B1 | 4/2003 | Ando et al. | |
| 6,603,535 B1 * | 8/2003 | McDowell | 356/28 |
| 7,085,410 B2 * | 8/2006 | Redert | 382/154 |
| 7,262,767 B2 | 8/2007 | Yamada | |
| 2009/0116732 A1 * | 5/2009 | Zhou et al. | 382/154 |

FOREIGN PATENT DOCUMENTS

| | | |
|---|---|---|
| JP | 5-14932 | 1/1993 |
| JP | 6-194602 | 7/1994 |
| JP | 8-30806 | 2/1996 |
| JP | 9-107562 | 4/1997 |
| JP | 10-51812 | 2/1998 |
| JP | 2000-209614 | 7/2000 |
| JP | 2005-151534 | 6/2005 |

* cited by examiner

*Primary Examiner* — Chirag R Patel
(74) *Attorney, Agent, or Firm* — Finnegan, Henderson, Farabow, Garrett & Dunner, L.L.P.

(57) ABSTRACT

An image data analyzing apparatus includes a monocular visual depth information determiner for determining the anteroposterior relationship of regions contained in an image frame of one of a left image and a right image forming stereoscopic image data of time-division display type, a binocular visual depth information determiner for determining the anteroposterior relationship of regions contained in a plurality of images assumed to be the left image and right image, and a left-right image discriminator for outputting left-right image identification information in agreement with an assumption of the binocular visual depth information determiner if a pair of determination results show a high rate of agreement, and outputting left-right image identification information in agreement with a reverse setting of the assumption if the pair of determination results show a low rate of agreement.

13 Claims, 10 Drawing Sheets

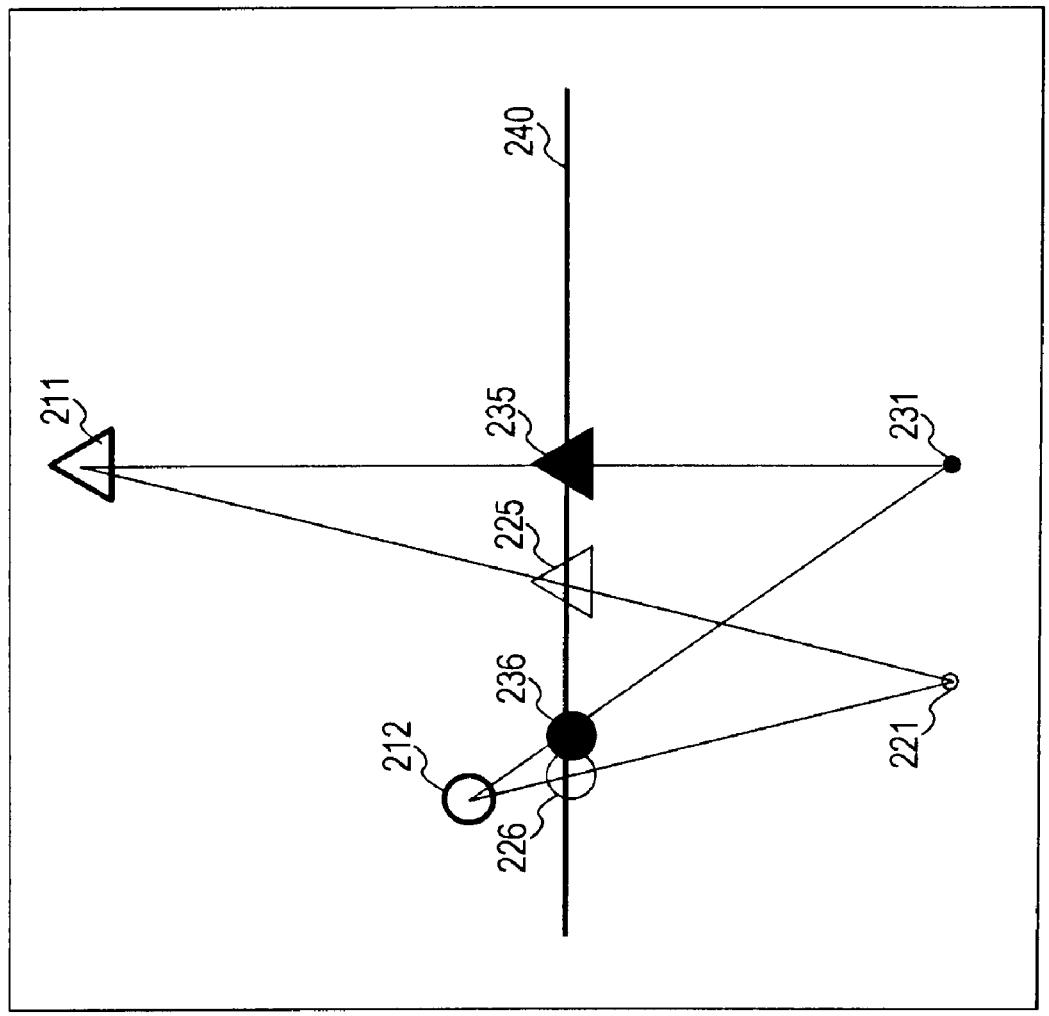

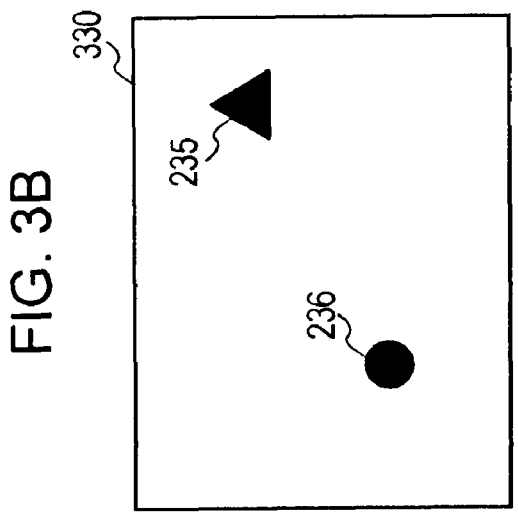
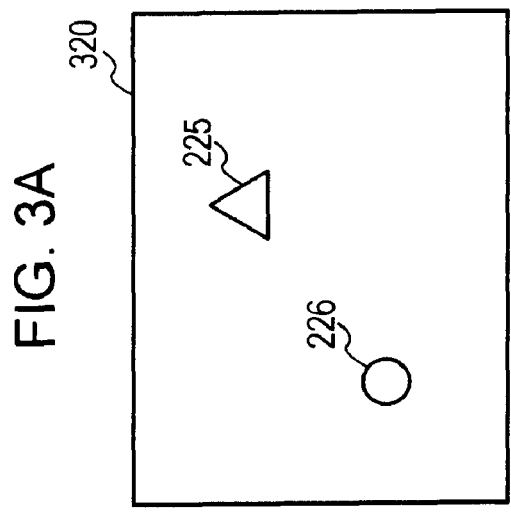
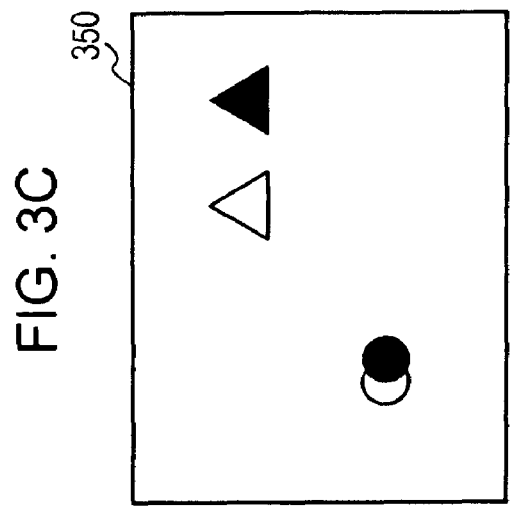

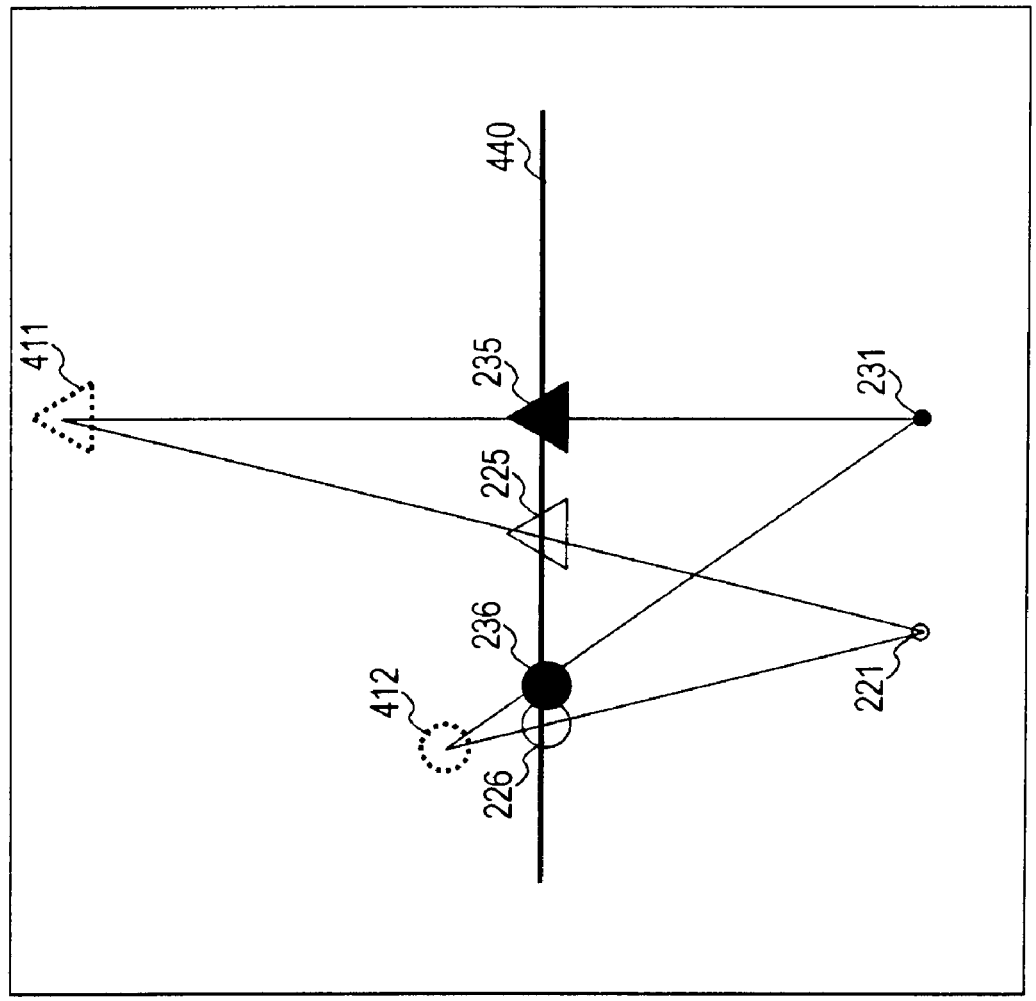

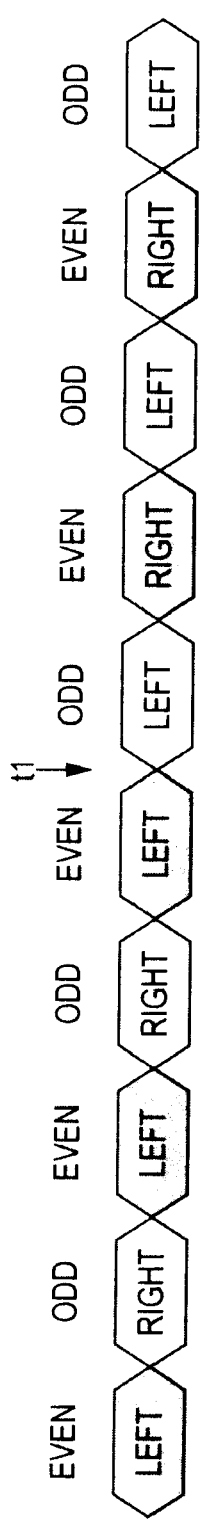 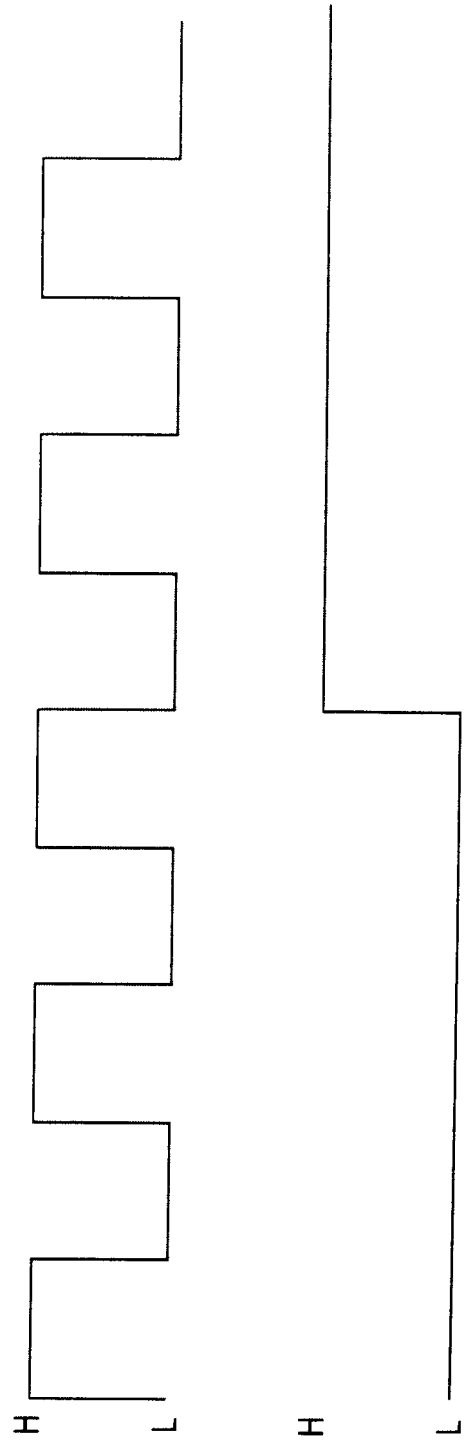
FIG. 8A
FIG. 8B
FIG. 8C
FIG. 8D

APPARATUS, METHOD, AND COMPUTER PROGRAM FOR ANALYZING IMAGE DATA

BACKGROUND OF THE INVENTION

1. Field of the Invention

The present invention relates to an apparatus, method, and computer program for analyzing image data. More specifically, the present invention relates to an apparatus, method, and computer program for performing image analysis that allows a user to view correctly a time-division stereoscopic image.

The present invention also relates to an apparatus, method, and computer program for generating a control signal for an image display control process or other control process. In the image display control process, appropriate image displaying is performed by determining whether each frame is a left image or a right image in time-division stereoscopic image data containing no information indicating whether each frame thereof is a left image or a right image, and in the other control process, observation eyeglasses for viewing the display image and a polarizer are controlled.

2. Description of the Related Art

Image data of video media, such as television and video apparatus, is typically displayed on a flat screen. A person viewing the displayed video may not perceive depth information related to the video. It is well known in the art that the stereoscopic displaying technique allows a viewer to perceive a depth even if the image data is displayed on a flat surface. The stereoscopic displaying technique, though in a practical use phase thereof, has not been widely accepted.

A three-dimensional (3D) television receiver supporting stereoscopic viewing is now commercially available, and testing of stereoscopic image broadcasting on a general broadcasting network has started. Cinemas showing a 3D movie are rapidly increasing. An environment of enjoying the 3D video is thus going to be established.

In the stereoscopic displaying, videos captured from different viewpoints are presented to the left and right eyes of the viewer so that the viewer may perceive a depth because of parallax between the left and right images or because of convergence. As a result, humans can perceive a depth even on the video data that is displayed on a flat surface. For example, Japanese Unexamined Patent Application Publication Nos. 9-107562, 8-30806, 10-51812, 2000-209614, 2005-151534, and 6-194602 disclose stereoscopic image display processes in the related art.

Various techniques of stereoscopic displaying presenting different videos on the left and right eyes have been proposed. One technique is a time-division method. In the time-division method, the different videos presented to the left and right eyes are alternately displayed (hereinafter a video to be presented to the left eye only is referred to as a left image and a video to be presented to the right eye only is referred to as a right image). For example, the left image is displayed as an even-numbered frame and the right image is displayed as an odd-numbered frame.

The viewer views the image with liquid-crystal shutter eyeglasses on. The liquid-crystal shutter eyeglasses alternately open and close the left and right eye sections thereof. At the presentation timing of the left image, the left eye section of the liquid-crystal shutter eyeglasses is opened and the right eye section is closed. This control causes incident light to the right eye of the viewer to be blocked while allowing the incident light to enter the left eye only. At the presentation timing of the right image, the right eye section of the liquid-crystal shutter eyeglasses is opened and the left eye section is closed. This control causes incident light to the left eye of the viewer to be blocked while allowing the incident light to enter the right eye only. The viewer thus views the left image with the left eye and the right image with the right eye. The stereoscopic image displaying is thus achieved.

In another technique, the left image and the right image are respectively displayed as a left-handed circularly polarized image and a right-handed circularly polarized image. The viewer wears polarized glasses, thereby alternately viewing the left image and the right image with the left eye and the right eye, respectively.

The liquid-crystal shutter eyeglasses and polarized glasses are known and used as a stereoscopic image display device of time-division type. When the liquid-crystal shutter eyeglasses are used in the stereoscopic image display system of time-division type, appropriate stereoscopic displaying may not be achieved if the opening timing of the liquid-crystal shutter eyeglasses is not synchronized with the display timing of the left and right images. More specifically, if left and right images are inverted, for example, the right eye section of the liquid-crystal shutter eyeglasses is opened with the left image presented, or the left eye section of the liquid-crystal shutter eyeglasses is opened with the right image presented, the viewer views a video with the depth thereof also inverted. The viewer thus perceives an object more behind than the right position thereof or more front than the right position thereof. As a result, the viewer may feel uncomfortable and even fatigued.

To avoid left-right image inversion, Japanese Unexamined Patent Application Publication No. 05-14932 discloses a stereoscopic television signal processing method. According to the disclosure, a left and right identification signal is superimposed on an image signal and shutter eyeglasses are driven in response to the identification signal. This technique still has to superimpose beforehand the left and right identification signal onto the image signal and does not work with time-division stereoscopic display image data if no identification information is superimposed on the image signal.

Also available is a driving device of shutter eyeglasses which includes a switch, with which the viewer can reverse the display timing of the left and right images if the viewer feels the image is left-right reversed. However, not all the viewers can properly recognize the occurrence of a left-right reverse image. It is not certain that a left image reliably alternates with a right image. A plurality of different pieces of image data are successively reproduced, the display timing of the left and right images is not necessarily consistent. The switching operation has to be performed each time the left-right image reversal takes place.

SUMMARY OF THE INVENTION

It is thus desirable to provide an apparatus, method, and computer program for performing a time-division stereoscopic image display process with a left image for the left eye and a right image for the right eye being alternately displayed in a manner such that the viewer views the left image with the left eye and the right image with the right eye rather than in the other way around.

According to one embodiment of the present invention, an image data analyzing apparatus includes a monocular visual depth information determiner for receiving stereoscopic image data of time-division display type composed of a left image for the left eye of a user and a right image for the right eye of the user, and determining the anteroposterior relationship of regions contained in an image frame of one of the left image and the right image, a binocular visual depth information determiner for receiving the stereoscopic image data of time-division display type, selecting an image assumed to be the left image and an image assumed to be the right image, and determining the anteroposterior relationship of regions contained in an image frame of a plurality of images containing the selected left image and right image, and a left-right image discriminator for receiving a first determination result of the monocular visual depth information determiner, and a second determination result of the binocular visual depth information determiner, comparing the first determination result with the second determination result, determining that an assumption set by the binocular visual depth information determiner is correct if the rate of agreement between the first determination result of the monocular visual depth information determiner and the second determination result of the binocular visual depth information determiner is high, and outputting identification information representing whether each image frame of the stereoscopic image data is the left image or the right image as identification information in agreement with the assumption.

In the image data analyzing apparatus, the left-right image discriminator determines that the assumption set by the binocular visual depth information determiner is incorrect if the rate of agreement between the first determination result of the monocular visual depth information determiner and the second determination result of the binocular visual depth information determiner is low, and outputs the identification information representing whether each image frame of the stereoscopic image data is the left image or the right image as identification information in agreement with a reverse setting of the assumption.

In the image data analyzing apparatus, each of the monocular visual depth information determiner and the binocular visual depth information determiner may generate a plurality of determination results relating to a plurality of regions. The left-right image discriminator receives and compares a plurality of first determination results of the monocular visual depth information determiner and a plurality of second determination results of the binocular visual depth information determiner. The left-right image discriminator determines that the assumption set by the binocular visual depth information determiner is correct if the rate of agreement is equal to or higher than a predetermined threshold value, and outputs identification information representing whether each image frame of the stereoscopic image data is the left image or the right image as identification information in agreement with the assumption. The left-right image discriminator determines that the assumption set by the binocular visual depth information determiner is incorrect if the rate of agreement is lower than the predetermined threshold value, and outputs the identification information representing whether each image frame of the stereoscopic image data is the left image or the right image as identification information matching a reverse setting of the assumption.

In the image data analyzing apparatus, the binocular visual depth information determiner divides the image frames of the stereoscopic image data of time-division display type into an even frame and an odd frame, sets up a first assumption that the even frame is the left image and that the odd frame is the right image, or an assumption reverse to the first assumption, and determines under the set assumption the anteroposterior relationship of regions contained in an image frame of the plurality of images containing the left image and the right image.

In the image data analyzing apparatus, the binocular visual depth information determiner performs a stereomatching process on the plurality of images containing the selected left image and right image in order to determine the anteroposterior relationship of regions contained in the image frame.

In the image data analyzing apparatus, the monocular visual depth information determiner determines the anteroposterior relationship of regions contained in the image frame from an image blur of the regions or a vertical positional relationship of the regions contained in the image frame of one of the left image and the right image.

In the image data analyzing apparatus, the monocular visual depth information determiner determines the anteroposterior relationship of two regions by detecting an overlap between the two regions through tracking the two regions moving on a plurality of left images or right images.

According to one embodiment of the present invention, a liquid-crystal shutter control apparatus includes a monocular visual depth information determiner for receiving stereoscopic image data of time-division display type composed of a left image for the left eye of a user and a right image for the right eye of the user, and determining the anteroposterior relationship of regions contained in an image frame of one of the left image and the right image, a binocular visual depth information determiner for receiving the stereoscopic image data of time-division display type, selecting an image assumed to be the left image and an image assumed to be the right image, and determining the anteroposterior relationship of regions contained in an image frame of a plurality of images containing the selected left image and right image, a left-right image discriminator for receiving a first determination result of the monocular visual depth information determiner, and a second determination result of the binocular visual depth information determiner, comparing the first determination result with the second determination result, determining that an assumption set by the binocular visual depth information determiner is correct if the rate of agreement between the first determination result of the monocular visual depth information determiner and the second determination result of the binocular visual depth information determiner is high, and outputting identification information representing whether each image frame of the stereoscopic image data is the left image or the right image as identification information in agreement with the assumption, a shutter drive signal output unit for outputting a shutter drive signal driving liquid-crystal shutter eyeglasses that are switched by image frame with the image frames forming the stereoscopic image data, and a signal inverter for receiving the identification signal output from the left-right image discriminator, and the shutter drive signal output from the shutter drive signal output unit, modifying the shutter drive signal in response to the identification signal and outputting the modified signal as a control signal to the liquid-crystal shutter eyeglasses.

In the liquid-crystal shutter control apparatus, the signal inverter exclusive OR gates the identification signal output from the left-right image discriminator and the shutter drive signal output from the shutter drive signal output unit, and outputs the exclusive OR gate results as a control signal to the liquid-crystal shutter eyeglasses.

According to one embodiment of the present invention, a polarization control apparatus includes a monocular visual depth information determiner for receiving stereoscopic image data of time-division display type composed of a left image for the left eye of a user and a right image for the right eye of the user, and determining the anteroposterior relationship of regions contained in an image frame of one of the left image and the right image, a binocular visual depth information determiner for receiving the stereoscopic image data of time-division display type, selecting an image assumed to be the left image and an image assumed to be the right image, and determining the anteroposterior relationship of regions contained in an image frame of a plurality of images containing the selected left image and right image, a left-right image discriminator for receiving a first determination result of the monocular visual depth information determiner, and a second determination result of the binocular visual depth information determiner, comparing the first determination result with the second determination result, determining that an assumption set by the binocular visual depth information determiner is correct if the rate of agreement between the first determination result of the monocular visual depth information determiner and the second determination result of the binocular visual depth information determiner is high, and outputting identification information representing whether each image frame of the stereoscopic image data is the left image or the right image as identification information in agreement with the assumption, a polarizer drive signal output unit for outputting a polarizer drive signal driving a polarizer that is switched by image frame with the image frames forming the stereoscopic image data, and a signal inverter for receiving the identification signal output from the left-right image discriminator, and the polarizer drive signal output from the polarizer drive signal output unit, modifying the polarizer drive signal in response to the identification signal and outputting the modified signal as a control signal to the polarizer.

In the polarization control apparatus, the signal inverter exclusive OR gates the identification signal output from the left-right image discriminator and the polarizer drive signal output from the polarizer drive signal output unit, and outputs the exclusive OR gate results as a control signal to the polarizer.

According to one embodiment of the present invention, an image data analyzing method includes the steps of receiving stereoscopic image data of time-division display type composed of a left image for the left eye of a user and a right image for the right eye of the user, and determining in a first determination the anteroposterior relationship of regions contained in an image frame of one of the left image and the right image, receiving the stereoscopic image data of time-division display type, selecting an image assumed to be the left image and an image assumed to be the right image, and determining in a second determination the anteroposterior relationship of regions contained in an image frame of a plurality of images containing the selected left image and right image, and receiving a first determination result of the first determination, and a second determination result of the second determination, comparing the first determination result with the second determination result, determining that an assumption set in the second determination is correct if the rate of agreement between the first determination result and the second determination result is high, and outputting identification information representing whether each image frame of the stereoscopic image data is the left image or the right image as identification information in agreement with the assumption.

According to one embodiment of the present invention, a computer program for causing a computer to execute an image analysis process, includes the steps of receiving stereoscopic image data of time-division display type composed of a left image for the left eye of a user and a right image for the right eye of the user, and determining in a first determination the anteroposterior relationship of regions contained in an image frame of one of the left image and the right image, receiving the stereoscopic image data of time-division display type, selecting an image assumed to be the left image and an image assumed to be the right image, and determining in a second determination the anteroposterior relationship of regions contained in an image frame of a plurality of images containing the selected left image and right image, and receiving a first determination result of the first determination, and a second determination result of the second determination, comparing the first determination result with the second determination result, determining that an assumption set in the second determination is correct if the rate of agreement between the first determination result and the second determination result is high, and outputting identification information representing whether each image frame of the stereoscopic image data is the left image or the right image as identification information in agreement with the assumption.

The computer program of one embodiment of the present invention may be supplied via a storage medium or a communication medium in a computer readable manner to a general-purpose computer system that executes a variety of program code. By supplying the computer system with the computer program in a computer readable manner, the computer system executes a process responsive to the computer program.

These and other features and advantages will be apparent from the following description and the accompanying drawings. The term system in the context of this specification refers to a logical set of a plurality of apparatuses, and is not limited to an apparatus having all elements contained in a single housing.

According to embodiments of the present invention, the stereoscopic image data of time-division display type is input and whether the image frame of the input data is the left image for the left eye or the right image for the right eye is accurately determined. The image data analyzing apparatus includes the monocular visual depth information determiner for determining the anteroposterior relationship of regions contained in an image frame of one of the left image and the right image, the binocular visual depth information determiner for determining the anteroposterior relationship of regions contained in an image frame of a plurality of images containing the image assumed to be the left image and the image assumed to be the right image, and the left-right image discriminator for outputting left-right image identification information in agreement with an assumption of the binocular visual depth information determiner if a pair of determination results show a high rate of agreement, and outputting left-right image identification information in agreement with a reverse to the setting of the assumption if the pair of determination results show a low rate of agreement. This process allows each image forming the stereoscopic image data of time-division display type to be correctly discriminated as the left image or right image. Under the control based on the identification information, a stereoscopic image providing a correct visual depth is displayed and viewed.

BRIEF DESCRIPTION OF THE DRAWINGS

FIGS. 2A and 2B illustrate the status of a left image and a right image of stereoscopic image data during capturing, and a positional relationship of a camera, an object and the object in a captured image;

FIGS. 3A-3C illustrate the left image and the right image forming the stereoscopic image data, and a positional relationship of objects or regions contained in each image;

FIGS. 4A and 4B illustrate a process of estimating an actual position of an object from the left image and the right image forming the stereoscopic image data, and the position of the objects or the regions contained in each image;

FIGS. 8A-8D illustrate a signal sequence and a signal pattern of each element of the liquid-crystal shutter controller;

DESCRIPTION OF THE PREFERRED EMBODIMENTS

An apparatus, method, and computer program for analyzing image data are described below with reference to the drawings.

Figure 1:
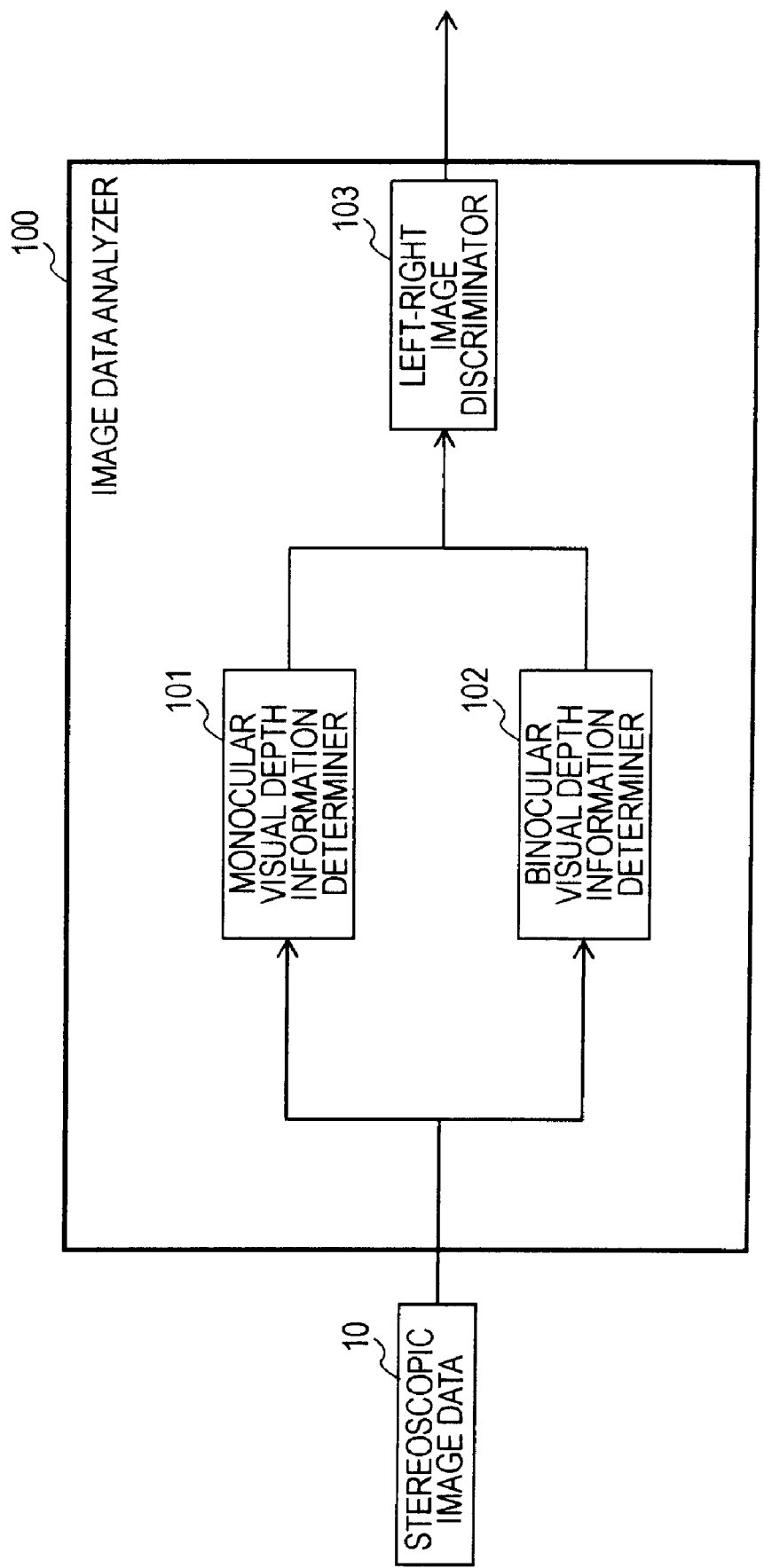
FIG. 1 is an image data analyzer in accordance with one embodiment of the present invention.

FIG. 1 illustrates a basic structure of an image data analyzer 100 in accordance with one embodiment of the present invention. As illustrated in FIG. 1, the image data analyzer 100 includes monocular visual depth information determiner 101, binocular visual depth information determiner 102 and left-right image discriminator 103.

The image data analyzer 100 receives time-division type stereoscopic image data 10. The time-division type stereoscopic image data 10 contains left images as image frames to be presented to the left eye only and right images as image frames to be presented to the right eye only with each left image and each right image alternately arranged. For example, a left image to be presented to the left eye is followed by a right image to be presented to the right eye, or vice versa.

The monocular visual depth information determiner 101 receives images for one eye of the frames forming the stereoscopic image data 10. The present embodiment is described on the premise that the monocular visual depth information determiner 101 receives only even frames. The monocular visual depth information determiner 101 references the input even frames, and determines a visual depth of each of a plurality of regions of each frame, and outputs the determination results to the left-right image discriminator 103.

On the other hand, the binocular visual depth information determiner 102 receives all the frames forming the stereoscopic image data 10. More specifically, the binocular visual depth information determiner 102 receives all the frames forming the image data in which the left images to be presented to the left eye and the right images to be presented to the right eye are alternately arranged.

The binocular visual depth information determiner 102 references the even and odd frames of the input stereoscopic image data 10, determines through a stereomatching process a visual depth of each of a plurality of regions of each frame based on an assumption that the even frame is a left image, and outputs the determination results to the left-right image discriminator 103.

The left-right image discriminator 103 examines whether the visual depth of the plurality of regions input from the monocular visual depth information determiner 101 contradicts the visual depth of the plurality of regions input from the binocular visual depth information determiner 102. The left-right image discriminator 103 thus discriminates which of the even frame and the odd frame of the stereoscopic image data 10 is the left image or the right image, and then outputs the discrimination results.

The monocular visual depth information determiner 101 is described below.

The monocular visual depth information determiner 101 receives either the right image for the right eye or the left image for the left eye of the frames forming the stereoscopic image data 10, namely, receives one of the even frame and the odd frame.

In the discussion that follows, it is assumed that only the even frames are input to the monocular visual depth information determiner 101. The monocular visual depth information determiner 101 selects at least two regions contained in one of the input even frames, and detects the anteroposterior relationship of the regions in the direction of depth using only the even frames.

A variety of methods may be applicable to detecting the anteroposterior relationship in the depth direction from one of the left image for the left eye and the right image for the right eye. For example, techniques in the related art for estimating the anteroposterior relationship of the regions from one frame include a method of estimating an image blur from the regions, a method of estimating that a region at a lower position in the vertical direction of the regions is determined as a region at a more frontward position in the depth direction, and other methods.

Methods of estimating the anteroposterior relationship of the regions using a plurality of frames (the even frames only) include a method of tracking two moving regions and detecting the anteroposterior relationship of the regions in the depth direction by detecting an overlap between the two moving regions.

Using one of these methods, the monocular visual depth information determiner 101 detects the anteroposterior relationship of a plurality of regions forming the image frame and of objects present within the image frame. It is sufficient if only the anteroposterior relationship in the depth direction is detected. It is not necessary to detect a specific depth of each region.

A monocular visual depth information determination process of the monocular visual depth information determiner 101 is specifically discussed below.

The monocular visual depth information determiner 101 detects the anteroposterior relationship of a plurality of regions forming the image frame, i.e., detects whether each region is far from or close to a camera having captured the image frame. If six regions A, B, C, D, E, and F are set up as targets of depth detection, the anteroposterior relationship of all the six regions A, B, C, D, E, and F is clarified. More specifically, the order of arrangement of the six regions A-F in the depth direction is detected.

For example, regions A and B, regions C and D, and regions E and F are respectively combined to determine the anteroposterior relationship of the regions in each combination. For example, information indicating that the region A is more front than the region B, that the region D is more front than the region C, and that the region E is more front than the region F is detected.

In each case, the monocular visual depth information determiner 101 detects a relative anteroposterior relationship of the regions in a plurality of regions within the frame, and outputs the determination results to the left-right image discriminator 103.

A process of the binocular visual depth information determiner 102 is described below. The binocular visual depth information determiner 102 receives the even frames and the odd frames forming the stereoscopic image data 10.

On the assumption that the even frame is a left image and that the odd frame is a right image, the binocular visual depth information determiner 102 then detects through the stereomatching process the depth of the same regions or objects as those used by the monocular visual depth information determiner 101.

Using the left image and the right image, the binocular visual depth information determiner 102 detects through the stereomatching process the depth of the plurality of regions or objects used by the monocular visual depth information determiner 101. A variety of methods are applicable as the stereomatching process. For example, a block matching method or a dynamic programming method may be used for the stereomatching process.

As previously discussed, the monocular visual depth information determiner 101 determines the anteroposterior relationship of the six regions A-F from only the even frames (the left images, for example). In this case, the binocular visual depth information determiner 102 also determines the anteroposterior relationship of the six regions A-F from the even frames and odd frames, i.e., the left images and right frames.

Disparities between the six regions are detected using the frames assumed to be the left images and the frames assumed to be the right frames, and the anteroposterior relationship of the six regions A-F is clarified. Optionally, the binocular visual depth information determiner 102 may determine the anteroposterior relationship of the regions in each of the combinations of the regions A and B, the regions C and D, and the regions E and F. For example, information indicating that the region A is more front than the region B, that the region D is more front than the region C, and that the region E is more front than the region F may be detected.

In either case, it is sufficient if the binocular visual depth information determiner 102 detects the anteroposterior relationship of the regions in the depth direction. It is not necessary to detect a specific depth quantity of each region. The binocular visual depth information determiner 102 then outputs the detection results of the anteroposterior relationship of the plurality of regions to the left-right image discriminator 103.

Each of the monocular visual depth information determiner 101 and the binocular visual depth information determiner 102 may execute process (1) determining the anteroposterior relationships of all the regions or process (2) determining the anteroposterior relationship of the regions in each of the combinations of the regions A and B, the regions C and D, and the regions E and F. One of the processes (1) and (2) is acceptable. However, the two determiners preferably executes the same process.

A process of the left-right image discriminator 103 is described below. The left-right image discriminator 103 determines whether the anteroposterior relationship of the regions or objects obtained from the monocular visual depth information determiner 101 agrees with the anteroposterior relationship of the regions or objects obtained from the binocular visual depth information determiner 102.

Depending on whether the determination results of the monocular visual depth information determiner 101 and the binocular visual depth information determiner 102 agree with each other, the left-right image discriminator 103 determines whether the even frame of the input stereoscopic image data 10 is the left image or the right image and the odd frame of the input stereoscopic image data 10 is the left image or the right image.

More specifically, if the anteroposterior relationship of the plurality of regions obtained by the monocular visual depth information determiner 101 agrees with the anteroposterior relationship of the plurality of regions by the binocular visual depth information determiner 102, the left-right image discriminator 103 determines, as the left image, one of the even frame and the odd frame assumed to be the left image by the binocular visual depth information determiner 102 through the stereomatching process and determines the other frame as the right image.

If the anteroposterior relationship of the plurality of regions obtained by the monocular visual depth information determiner 101 fails to agree with the anteroposterior relationship of the plurality of regions by the binocular visual depth information determiner 102, the left-right image discriminator 103 determines, as the right image, one of the even frame and the odd frame assumed to be the left image by the binocular visual depth information determiner 102 through the stereomatching process and determines the other frame as the left image.

Each of the monocular visual depth information determiner 101 and the binocular visual depth information determiner 102 analyzes the anteroposterior relationship of the regions in each of the combinations of the regions A and B, the regions C and D, and the regions E and F, and then inputs the determination results to the left-right image discriminator 103. The process of the left-right image discriminator 103 in response to the inputting of the determination results is described below.

The binocular visual depth information determiner 102 performs the stereomatching process based on the assumption that the even frame is a left image for the left eye and that the odd frame is a right image for the right eye.

Let A>B represent a determination that the region A is positioned behind the region B (the region A is farther than the region B from the camera having captured the image).

For example, each of the monocular visual depth information determiner 101 and the binocular visual depth information determiner 102 outputs information [A>B, C>D, E>F]. The information [A>B, C>D, E>F] represents that the region A is behind the region B (farther than the region B from the camera), that the region C is behind the region D, and that the region E is behind the region F.

Cases (a)-(c) are contemplated as follows:

Case (a): the determination result of the monocular visual depth information determiner 101 fully agrees with the determination result of the binocular visual depth information determiner 102;

Case (b): the determination result of the monocular visual depth information determiner 101 completely disagrees with the determination result of the binocular visual depth information determiner 102; and Case (c): the determination result of the monocular visual depth information determiner 101 partially agrees with the determination result of the binocular visual depth information determiner 102 wherein (c1) a rate of agreement portion is larger and (c2) a ratio of disagreement portion is larger.

In Case (a) where the determination result of the monocular visual depth information determiner 101 fully agrees with the determination result of the binocular visual depth information determiner 102, the output of the monocular visual depth information determiner 101 may be [A>B, C<D, E>F], and the output of the binocular visual depth information determiner 102 may be [A>B, C<D, E>F], for example.

In response to such determination results, the left-right image discriminator 103 executes the following process.

The determination result of the monocular visual depth information determiner 101 agrees with the determination result of the binocular visual depth information determiner 102. The left-right image discriminator 103 then determines the assumption set by the binocular visual depth information determiner 102, i.e., the assumption that the even frame is a left image and that the odd frame is a right image, is correct. As a result, the left-right image discriminator 103 outputs as left-right discrimination results the assumption used in the determination of the binocular visual depth information determiner 102, i.e., outputs the information that the even frame is a left image and that the odd frame is a right image.

In Case (b) where the determination result of the monocular visual depth information determiner 101 completely disagrees with the determination result of the binocular visual depth information determiner 102, the output of the monocular visual depth information determiner 101 may be [A>B, C<D, E>F], and the output of the binocular visual depth information determiner 102 may be [A<B, C>D, E<F], for example. The process of the left-right image discriminator 103 in response to the determination results is described below.

The determination results of the monocular visual depth information determiner 101 completely disagree with the determination results of the binocular visual depth information determiner 102. The left-right image discriminator 103 then determines that the assumption set in the depth determination of the binocular visual depth information determiner 102, i.e., the assumption that the even frame is a left image and that the odd frame is a right image, is incorrect. As a result, the left-right image discriminator 103 outputs as left-right discrimination results a setting reverse to the assumption used in the determination of the binocular visual depth information determiner 102, i.e., outputs the information that the even frame is a right image and that the odd frame is a left image.

In Case (c) where the determination result of the monocular visual depth information determiner 101 partially agrees with the determination result of the binocular visual depth information determiner 102, a process to be executed is different from Subcase (c1) where a rate of agreement portion is larger to Subcase (c2) where a ratio of disagreement portion is larger.

In Subcase (c1), the output of the monocular visual depth information determiner 101 may be [A>B, C<D, E>F], and the output of the binocular visual depth information determiner 102 may be [A>B, C<D, E<F], for example.

The determination results of the monocular visual depth information determiner 101 mostly agree with the determination results of the binocular visual depth information determiner 102. The left-right image discriminator 103 then determines the assumption set by the binocular visual depth information determiner 102, i.e., the assumption that the even frame is a left image and that the odd frame is a right image, is correct. As a result, the left-right image discriminator 103 outputs as left-right discrimination results the assumption used in the determination of the binocular visual depth information determiner 102, i.e., outputs the information that the even frame is a left image and that the odd frame is a right image. The left-right image discriminator 103 thus outputs this information as the left-right discrimination information.

In Subcase (c2), the output of the monocular visual depth information determiner 101 may be [A>B, C<D, E>F], and the output of the binocular visual depth information determiner 102 may be [A>B, C>D, E<F], for example.

The determination results of the monocular visual depth information determiner 101 mostly disagree with the determination results of the binocular visual depth information determiner 102. The left-right image discriminator 103 then determines the assumption set by the binocular visual depth information determiner 102, i.e., the assumption that the even frame is a left image and that the odd frame is a right image, is incorrect. As a result, the left-right image discriminator 103 outputs as left-right discrimination results an assumption reverse to the assumption used in the determination of the binocular visual depth information determiner 102, i.e., outputs the information that the even frame is a right image and that the odd frame is a left image. The left-right image discriminator 103 thus outputs this information as the left-right discrimination information.

The left-right image discriminator 103 determines that the assumption in the stereomatching process of the binocular visual depth information determiner 102 is correct if the anteroposterior relationships of the plurality of regions obtained by the monocular visual depth information determiner 101 and the binocular visual depth information determiner 102 do not contradict each other. The left-right image discriminator 103 thus outputs as the left-right discrimination result the same conclusion as the assumption used in the stereomatching process of the binocular visual depth information determiner 102. More specifically, the left-right image discriminator 103 outputs as the determination result the assumption of the binocular visual depth information determiner 102 regarding whether the even frame is the left image or the right image and whether the odd frame is the left image or the right image.

If the anteroposterior relationships of the plurality of regions contradict each other, the left-right image discriminator 103 determines that the assumption in the stereomatching process of the binocular visual depth information determiner 102 is incorrect. The left-right image discriminator 103 thus outputs as the left-right image discrimination result a conclusion reverse to the assumption in the stereomatching process of the binocular visual depth information determiner 102. In other words, the left-right image discriminator 103 outputs the conclusion reverse to the assumption of the binocular visual depth information determiner 102 regarding whether the even frame is the left image or the right image and whether the odd frame is the left image or the right image.

The left-right image discriminator 103 receives and compares a plurality of first determination results of the monocular visual depth information determiner 101 and a plurality of second determination results of the binocular visual depth information determiner 102. If the rate of agreement is equal to or higher than a predetermined threshold value (½, for example), the left-right image discriminator 103 determines that the assumption set by the binocular visual depth information determiner 102 is correct. The left-right image discriminator 103 thus outputs the discrimination information regarding whether each frame of the stereoscopic image data 10 is a left image or a right image as information in agreement with the assumption of the binocular visual depth information determiner 102.

If the rate of agreement is less than the predetermined threshold value, the left-right image discriminator 103 determines that the assumption set by the binocular visual depth information determiner 102 is incorrect. The left-right image discriminator 103 then outputs the discrimination information regarding whether each frame of the stereoscopic image data 10 is a left image or a right image as information in agreement with a setting reverse to the assumption of the binocular visual depth information determiner 102.

The left-right image discriminator 103 performs the above-described process, thereby outputting the correct discrimination information regarding the left image and the right image.

The basic principle of the left-right image discriminator 103 discriminating the left image and the right image in the above described process is described below with reference to FIGS. 2A and 2B through FIGS. 6A and 6B.

FIGS. 2A and 2B illustrate the status of the left and right images of the stereoscopic image data 10 when the image is captured. Referring to FIG. 2A, two cameras 220 and 230 capture the left and right images of the stereoscopic image data 10. FIG. 2A illustrates the positional relationship between objects 211 and 212 contained as capture targets and respective object images on an image surface 240 of the cameras 220 and 230. The left and right cameras 220 and 230 at different positions capture the images of the objects 211 and 212. The object 211 is behind the object 212 (farther from the camera position).

FIG. 2B is an enlarged view of FIG. 2A. FIG. 2B illustrates a camera center 221 of the camera 220 and a camera center 231 of the camera 230. The images of the objects captured by the left and right cameras are illustrated as captured objects 225, 226, 235 and 236.

The camera 220 capturing the left image for the left eye on the left-hand side captures an image containing captured object blank images 225 and 226 corresponding to the objects 211 and 212.

The camera 230 capturing the right image for the right eye on the right-hand side captures an image containing captured object solid images 235 and 236 corresponding to the objects 211 and 212.

The image frame obtained as a result includes a left image in FIG. 3A and a right image in FIG. 3B.

The image frame 320 in the left image in FIG. 3A contains the captured object images 225 and 226.

The image frame 330 in the right image in FIG. 3B contains the captured object images 235 and 236.

In the stereoscopic image display process of time-division type, the image frame 320 in the left image in FIG. 3A and the image frame 330 in the right image in FIG. 3B are consecutively displayed. For example, the even frames of the left image and the odd frames of the right frame are alternately displayed. If the display rate is high enough, the left image and the right image appears overlapped. An overlapped image 350 is illustrated in FIG. 3C. Using shutter eyeglasses, the left image is perceived by the left eye and the right image is perceived by the right eye. A stereoscopic image is thus viewed.

An image frame containing the image frame 320 in the left image in FIG. 3A and the image frame 330 in the right image in FIG. 3B is input to the image data analyzer 100 of the embodiment of the present invention. The image data analyzer 100 processes the input image frame. The process is described below.

The monocular visual depth information determiner 101 determines the anteroposterior relationship of at least two regions based on the image frame 320 in the left image in FIG. 3A. For simplicity of explanation, the captured object images 225 and 226 serve as depth termination regions. Hereinafter, the captured object image 225 is referred to as a region 225, and the captured object image 226 is referred to as a region 226.

The monocular visual depth information determiner 101 determines the anteroposterior relationship in the depth direction of the regions 225 and 226. The region 226 may be determined to be more front than the region 225, and such a determination result may be output to the left-right image discriminator 103.

The binocular visual depth information determiner 102 determines the anteroposterior relationship of the regions 225 and 226 through the stereomatching process using the image frame 320 in the left image in FIG. 3A and the image frame 330 in the right image in FIG. 3B.

In this process, the binocular visual depth information determiner 102 assumes that one of the even and odd frames as the consecutive frames forming the input stereoscopic image data 10 is a left image and that the other frame is a right image. The binocular visual depth information determiner 102 thus executes the stereomatching process under this assumption. The binocular visual depth information determiner 102 determines the anteroposterior relationship of the regions or objects.

The assumption of the binocular visual depth information determiner 102 may or may not be correct.

Process (A) is to be performed if the assumption of the binocular visual depth information determiner 102 is correct and process (B) is performed if the assumption of the binocular visual depth information determiner 102 is incorrect as described below.

Process (A) is described first. The process (A) is performed if the assumption of the binocular visual depth information determiner 102 is correct. In this case, the correct assumption is that the image frame 320 in the left image in FIG. 3A is a left image frame for the left eye, and the image frame 330 in the right image in FIG. 3B is a right image frame for the right eye.

A distance estimation process performed based on the image frame 320 and the image frame 330 in accordance with the above described assumption is described with reference to FIGS. 4A and 4B. FIGS. 4A and 4B illustrate the distance estimation process of objects 411 and 412. The position of the objects 411 and 412 is determined based position information of the regions 225, 226, 235, and 236 corresponding to the object images captured in the image frames 320 and 330 and camera position information of the cameras 220 and 230 acquired beforehand.

FIG. 4A illustrates the position estimation process of the objects 411 and 412 from two images captured at the same camera arrangement as illustrated in FIGS. 2A and 2B. The objects 411 and 412 outlined by broken line represent object positions estimated through a process described below.

FIG. 4B illustrates an enlarged view of FIG. 4A. A capturing surface 440 illustrated in FIG. 4B corresponds to the position within the camera having captured the image frame 320 and the image frame 330 illustrated in FIGS. 3A-3C. The stereomatching process performed on the image frame 320 and the image frame 330 shows that the region 226 in the image frame 320 and the region 236 in the image frame 330 result from capturing the same object. A point where lines connecting the camera centers 221 and 231 of the capturing cameras to the regions 226 and 236 on the capturing surface 440 intersect is estimated as an actual position of the object 412.

The position of the object 412 is estimated as described below.

A line is drawn to connect the camera center 221 of the left camera 220 having captured the left image to the region 226 contained in the image frame 320 assumed to be the left image in FIG. 3A, namely, the region 226 illustrated in FIG. 4B.

Similarly, a line is drawn to connect the camera center 231 of the right camera 230 having captured the right image to the region 236 contained in the image frame 330 assumed to be the right image in FIG. 3B, namely, the region 236 illustrated in FIG. 4B.

The intersection point of the two lines is estimated to be the position of the object 412 corresponding to the regions 226 and 236.

The position of the object 411 is estimated as described below.

A line is drawn to connect the camera center 221 of the left camera 220 having captured the left image to the region 225 contained in the image frame 320 assumed to be the left image in FIG. 3A, namely, the region 225 illustrated in FIG. 4B.

Similarly, a line is drawn to connect the camera center 231 of the right camera 230 having captured the right image to the region 235 contained in the image frame 330 assumed to be the left image in FIG. 3B, namely, the region 235 illustrated in FIG. 4B.

The intersection point of the two lines is estimated to be the position of the object 411 corresponding to the regions 225 and 235.

The binocular visual depth information determiner 102 thus determines that the object 411 corresponding to the regions 225 and 235 is behind the object 412 corresponding to the regions 226 and 236 (is farther than the object 412 from the cameras).

These results are output from the binocular visual depth information determiner 102 to the left-right image discriminator 103.

More specifically, the determination result [region 225>region 226] indicating that the region 226 in the image frame 320 assumed to be the left image illustrated in FIGS. 3A-3C is more front than the region 225 is output from the binocular visual depth information determiner 102 to the left-right image discriminator 103.

It is now assumed that the monocular visual depth information determiner 101 has obtained the same result, i.e., the determination result [region 225>region 226] indicating that the region 226 is more front than the region 225, and that the monocular visual depth information determiner 101 has output the determination result [region 225>region 226] to the left-right image discriminator 103.

The left-right image discriminator 103 then verifies that the determination result of the monocular visual depth information determiner 101 agrees with the determination result of the binocular visual depth information determiner 102. As a result, the left-right image discriminator 103 determines that the assumption used in the determination process of the binocular visual depth information determiner 102, namely, the assumption that the image frame 320 in the left image in FIG. 3A is a left image and that the image frame 330 in the right image in FIG. 3B is a right image is correct. The left-right image discriminator 103 outputs, as left-right image discrimination information, information having an identical setting of the assumption set in the determination process performed by the binocular visual depth information determiner 102, namely, the setting that the even frame is a left image and the odd frame is a right image.

The process (B) is performed if the assumption of the binocular visual depth information determiner 102 is incorrect as described below. The process (B) is described with reference to FIGS. 5A-5C and FIGS. 6A and 6B.

As described with reference to FIGS. 3A-3C, the correction assumption is that the image frame 320 in the left image in FIG. 3A is the left image frame for the left eye and that the image frame 330 in the right image in FIG. 3B is the right image frame for the right eye.

Figure 5B:
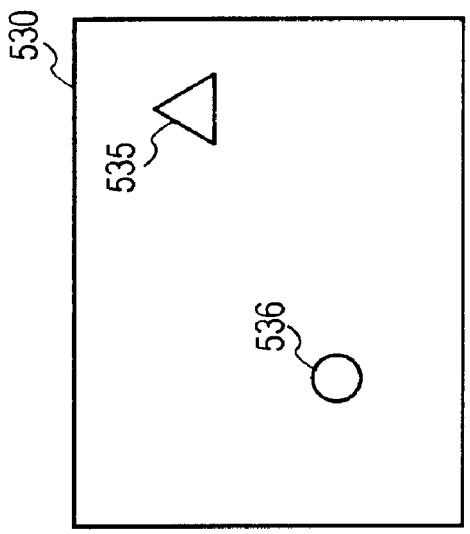
FIGS. 5A-5C illustrate a positional relationship of an object or a region contained in the image with the left image and the right image reversely set in the stereoscopic image data.
Figure 5A:
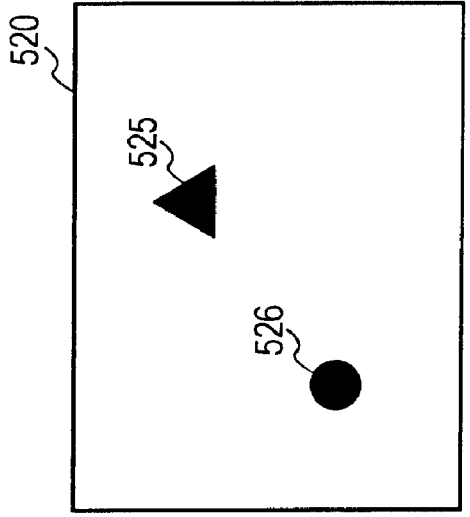
Figure 5C:
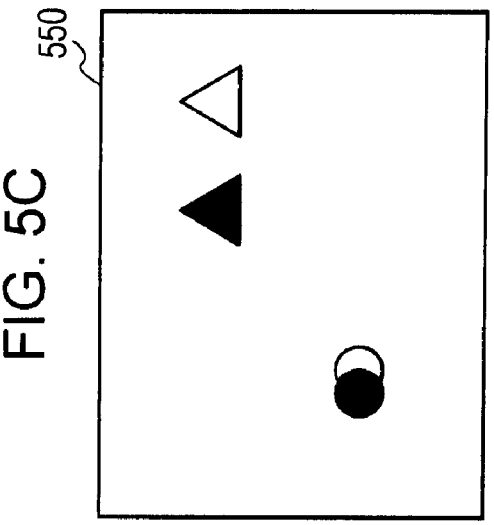

The incorrect assumption is the one contrary to the correct assumption. With reference to FIGS. 5A-5C, the incorrect assumption is that the image frame 520 in the left image in FIG. 5A is the right image frame for the right eye and that the image frame 530 in the right image in FIG. 5B is the left image frame for the left eye.

If the stereoscopic image display process of time-division type is performed based on the incorrect determination, a display image 550 illustrated in FIG. 5C results. If this display image is observed using shutter eyeglasses, the left image is viewed with right eye, and the right image is viewed with the left eye. The image is thus perceived with a visual depth different from the actual one.

Figure 6B:
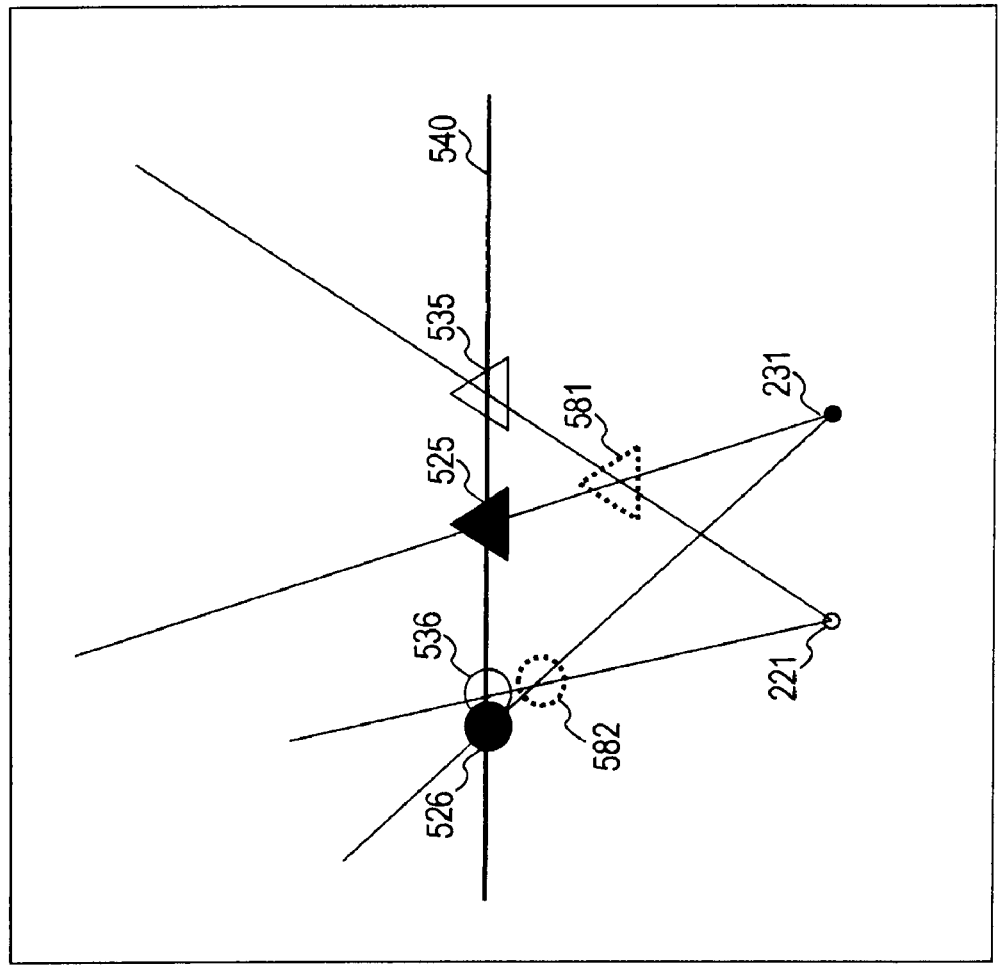
FIGS. 6A and 6B illustrate a process of estimating the object position in the stereoscopic image data with the left image and the right image reversely set.
Figure 6A:
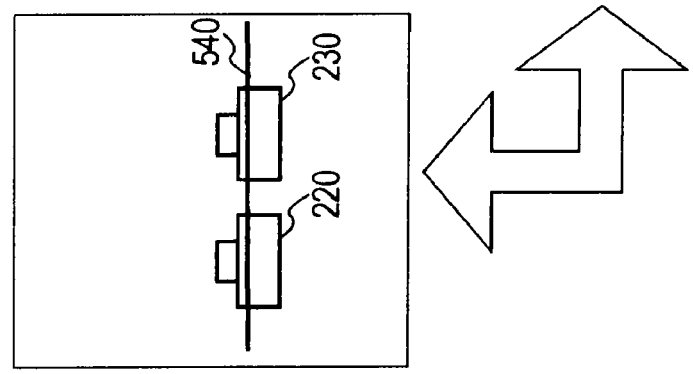

The distance estimation process of the binocular visual depth information determiner 102 based on the image frame 520 and the image frame 530 is described below with reference to FIGS. 6A and 6B. FIGS. 6A and 6B illustrate the position estimation process of objects 581 and 582. The position estimation process is performed based on position information of regions 525, 526, 535, and 536 within image frames corresponding to objects captured in the image frame 520 and the image frame 530 and camera position information of cameras 520 and 530 acquired beforehand.

FIGS. 6A and 6B illustrate how the actual positions of the objects 581 and 582 are estimated from the two images captured at the same camera positions as illustrated in FIGS. 2A and 2B and FIGS. 4A and 4B. The objects 581 and 582 denoted by broken outlines represent object positions estimated through a process discussed below.

FIG. 6B is an enlarged view of FIG. 6A. A image capturing surface 540 in FIG. 6B corresponds to inside position of the camera having captured the image frame 520 and the image frame 530 illustrated in FIGS. 5A and 5B. The stereomatching process performed on the image frame 520 and the image frame 530 shows that the region 526 in the image frame 520 and the region 536 in the image frame 530 result from capturing the same object. A point where lines connecting the camera centers 221 and 231 of the capturing cameras to the regions 526 and 536 on the capturing surface 540 intersect is estimated as an actual position of the object 582.

The position of the object 582 is estimated as described below.

A line is drawn to connect the camera center 231 of the right camera 230 having captured the right image to the region 526 contained in the image frame 520 incorrectly assumed to be the right image in FIG. 5A, namely, the region 526 illustrated in FIG. 6B.

Similarly, a line is drawn to connect the camera center 221 of the left camera 220 having captured the left image illustrated in FIG. 5B to the region 536 contained in the image frame 530 incorrectly assumed to be the left image in FIG. 5B, namely, the region 536 illustrated in FIG. 6B.

The intersection point of the two lines is estimated to be the position of the object 582 corresponding to the regions 526 and 536.

The position of the object 581 is estimated as described below.

A line is drawn to connect the camera center 231 of the right camera 230 having captured the right image to the region 525 contained in the image frame 520 incorrectly assumed to be the right image in the in FIG. 5A, namely, the region 525 illustrated in FIG. 6B.

Similarly, a line is drawn to connect the camera center 221 of the left camera 220 having captured the left image to the region 535 contained in the image frame 530 incorrectly assumed to be the left image in FIG. 5B, namely, the region 535 illustrated in FIG. 6B.

The intersection point of the two lines is estimated to be the position of the object 581 corresponding to the regions 525 and 535.

The binocular visual depth information determiner 102 thus determines that the object 581 corresponding to the regions 525 and 535 is more front than the object 582 corresponding to the regions 526 and 536 (is closer than the object 582 to the cameras).

These results are output from the binocular visual depth information determiner 102 to the left-right image discriminator 103.

More specifically, the determination result [region 526>region 525] indicating that the region 526 in the image frame 520 assumed to be the right image illustrated in FIG. 5A is behind the region 525 is output from the binocular visual depth information determiner 102 to the left-right image discriminator 103.

It is now assumed that the monocular visual depth information determiner 101 has obtained the result different from the above determination result, i.e., the determination result [region 525>region 526] indicating that the region 526 is more front than the region 525, and that the monocular visual depth information determiner 101 has output the determination result [region 525>region 526] to the left-right image discriminator 103.

The left-right image discriminator 103 then verifies that the determination result of the monocular visual depth information determiner 101 disagrees with the determination result of the binocular visual depth information determiner 102. As a result, the left-right image discriminator 103 determines that the assumption used in the determination process of the binocular visual depth information determiner 102, namely, the assumption that the image frame 520 in FIG. 5A is a right image and that the image frame 530 in FIG. 3B is a left image is incorrect. The left-right image discriminator 103 outputs, as left-right image discrimination information, information having a setting reverse to the assumption set in the determination process performed by the binocular visual depth information determiner 102, namely, outputs the setting that the even frame is a left image and the odd frame is a right image.

The anteroposterior relationship of the regions or objects determined by the monocular visual depth information determiner 101 based on the image for the left eye or the image for the right eye may or may not agree with the anteroposterior relationship of the regions or objects determined by the binocular visual depth information determiner 102 through the stereomatching process under the assumption of the left and right images.

If the two results agree with each other, the assumption of the left and right images set by the binocular visual depth information determiner 102 are correct. If the two results disagree with each other, the assumption of the left and right images set by the binocular visual depth information determiner 102 are incorrect. The left-right image discriminator 103 discriminates between the correct and incorrect assumption and outputs the discrimination results.

More specifically, the left-right image discriminator 103 determines that the assumption set in the determination process performed by the binocular visual depth information determiner 102 is correct if the anteroposterior relationship of the regions or objects provided by the monocular visual depth information determiner 101 agrees with the anteroposterior relationship of the regions or objects provided by the binocular visual depth information determiner 102. The left-right image discriminator 103 then outputs, as the left-right discrimination result, information in agreement with the assumption.

On the other hand, the left-right image discriminator 103 determines that the assumption set in the determination process performed by the binocular visual depth information determiner 102 is incorrect if the anteroposterior relationship of the regions or objects provided by the monocular visual depth information determiner 101 disagrees with the anteroposterior relationship of the regions or objects provided by the binocular visual depth information determiner 102. The left-right image discriminator 103 then outputs, as the left-right discrimination result, information reverse to the assumption.

The image data analyzer 100 thus correctly recognizes which of the even frame and the odd frame forming the input time-division stereoscopic image data is a left image and which is a right image. The image data analyzer 100 outputs the analysis result.

The analysis results of the image data analyzer 100 may be used by a control apparatus of liquid-crystal shutter eyeglasses for stereoscopic image displaying and a control apparatus of a polarizer for stereoscopic image display process.

Figure 7:
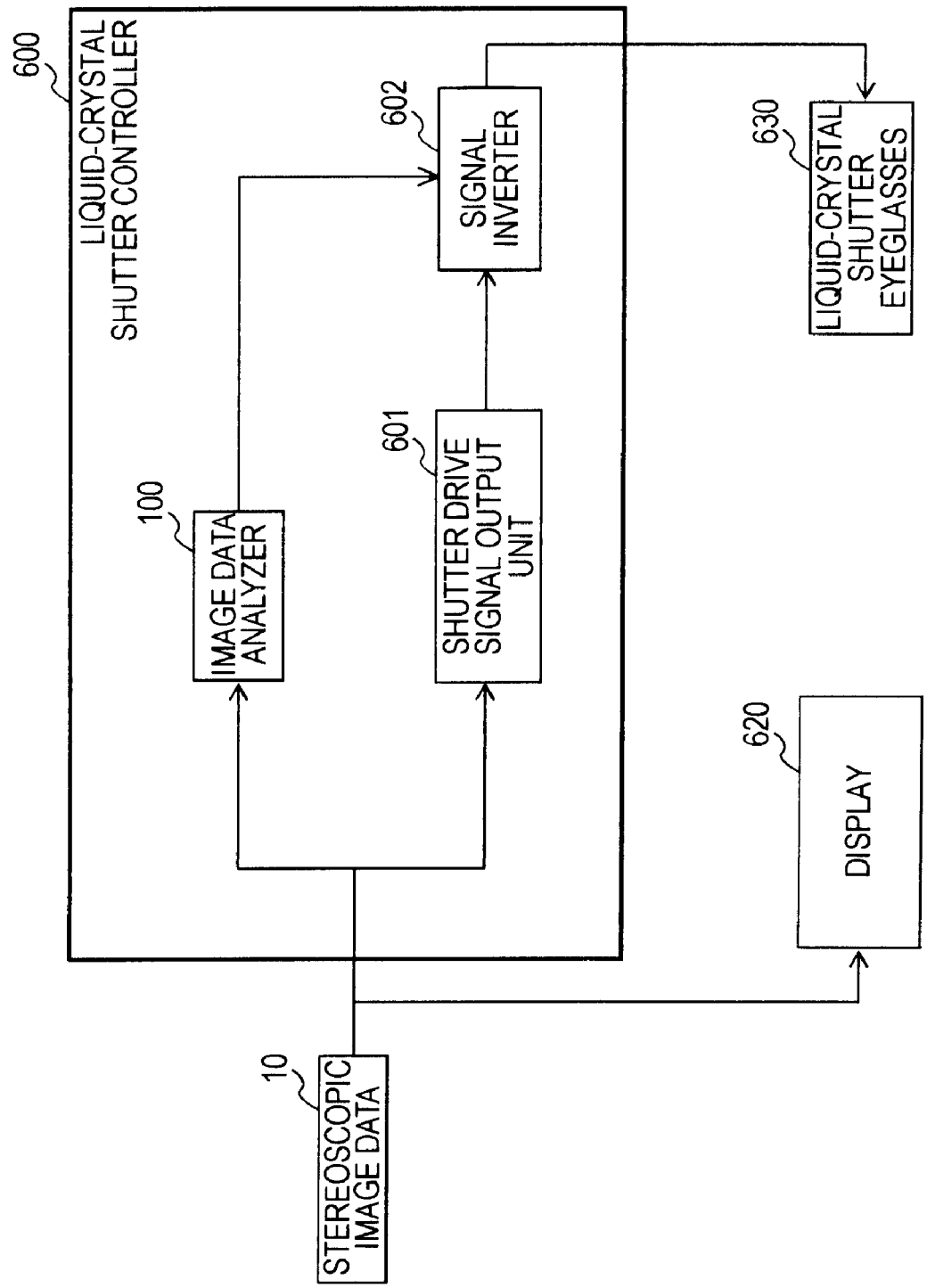
FIG. 7 illustrates a determination result of the left image and the right image by the image data analyzer, the determination result being used by a liquid-crystal shutter controller that drives and controls liquid-crystal shutter eyeglasses for stereoscopic image viewing.

FIG. 7 illustrates a liquid-crystal shutter controller 600. The liquid-crystal shutter controller 600 uses the analysis results of the left image and the right image provided by the image data analyzer 100 discussed with reference to FIGS. 1 through 6A and 6B in order to drive and control liquid-crystal shutter eyeglasses for stereoscopic image displaying.

The liquid-crystal shutter controller 600 illustrated in FIG. 7 includes a shutter drive signal output unit 601 and a signal inverter 602 in addition to the image data analyzer 100 previously discussed with reference to FIGS. 1 through 6A and 6B.

The stereoscopic image data 10 is time-division stereoscopic image data in which left images for the left eye and right images for the right eye alternately appear as different frames. The stereoscopic image data 10 is the same data as the data input to the image data analyzer 100 illustrated in FIG. 1. The stereoscopic image data 10 is input to the liquid-crystal shutter controller 600 and a display 620.

The display 620 displays alternately the left image and the right image of the time-division stereoscopic image data 10. The image displayed on the display 620 is viewed by a user (not shown) wearing liquid-crystal shutter eyeglasses 630. The liquid-crystal shutter controller 600 outputs a drive signal to the liquid-crystal shutter eyeglasses 630.

The liquid-crystal shutter controller 600 outputs a control signal that closes a right shutter of the liquid-crystal shutter eyeglasses 630 while opening a left shutter at the timing the left image for the left eye is output on the display 620. Also, the liquid-crystal shutter controller 600 outputs a control signal that closes the left shutter of the liquid-crystal shutter eyeglasses 630 while opening the right shutter at the timing the right image for the right eye is output on the display 620.

In response to a vertical synchronization signal of the stereoscopic image data 10, the shutter drive signal output unit 601 generates and outputs a signal driving the liquid-crystal shutter eyeglasses 630. The drive signal is a rectangular wave as illustrated in FIG. 8B, for example. During a high-state of the signal, the left shutter of the liquid-crystal shutter eyeglasses 630 is opened. During a low-state of the signal, the right shutter of the liquid-crystal shutter eyeglasses 630 is opened. FIG. 8A illustrates a switching sequence of the images displayed on the display 620. The label "LEFT" means a left image and the label "RIGHT" means a right image.

If the signal remains high while the left image for the left eye is displayed on the display 620, and if the signal remains low while the right image for the right eye is displayed on the display 620, the user wearing the liquid-crystal shutter eyeglasses 630 views the left image with the left eye and the right image with the right eye. An appropriate stereoscopic image is thus viewed.

The shutter drive signal output unit 601 can generate a signal synchronized with the image signal, but does not discriminate between the left and right frames displayed. There is a possibility that the signal becomes high while the right image is displayed and that the signal becomes low while the left image is displayed. It is noted that the signal output from the shutter drive signal output unit 601 is transitioned to high at the timing the even frame is displayed, and is transitioned to low at the timing the odd frame is displayed. Alternatively, the signal output from the shutter drive signal output unit 601 may be transitioned in a manner reverse to the above sequence. In the case of the reverse sequence, the binocular visual depth information determiner 102 in the image data analyzer 100 may have the reverse assumption relating to whether the even frame or the odd frame is the left image.

A process of the image data analyzer 100 within the liquid-crystal shutter controller 600 illustrated in FIG. 7 is described below. As previously discussed with reference to FIGS. 1 through 6A and 6B, the image data analyzer 100 receives the stereoscopic image data 10, determines whether one of the even frame and the odd frame forming the stereoscopic image data 10 is the left image or the right image, and outputs the determination results. More specifically, if the even frame is a left image with the odd frame being a right image, a low signal is output, and if the odd frame is a left image with the even frame being a right image, a high signal is output.

A process of the signal inverter 602 is described below. The signal inverter 602 exclusive-OR gates the output from the image data analyzer 100 and the output from the shutter drive signal output unit 601. The output of the signal inverter 602 is supplied to the liquid-crystal shutter eyeglasses 630 via a communication cable or in a wireless fashion, such as infrared communication. The output from the signal inverter 602 thus drives the left and right shutters of the liquid-crystal shutter eyeglasses 630 alternately.

The liquid-crystal shutter eyeglasses 630 thus constructed is controlled in synchronization with the left image and the right image displayed on the display 620. The right shutter of the liquid-crystal shutter eyeglasses 630 is closed and the left shutter is opened at the timing the left image for the left eye is output on the display 620. The left shutter of the liquid-crystal shutter eyeglasses 630 is closed and the right shutter is opened at the timing the right image for the right eye is output on the display 620. Such a control signal is output from the liquid-crystal shutter controller 600 to the liquid-crystal shutter eyeglasses 630.

FIGS. 8A-8D illustrate signals generated by the liquid-crystal shutter controller 600 of FIG. 7.

FIG. 8A illustrates an image switching sequence displayed on the display 620. The label "LEFT" indicates a left image, and the label "RIGHT" indicates a right image. At timing t1, one left image is followed by another left image.

Prior to timing t1, each of the even frames is a left image and each of the odd images is a right image. Subsequent to timing t1, each of the even frames is switched to a right image and each of the odd images is switched to a left image.

FIG. 8B illustrates the output of the shutter drive signal output unit 601. As previously discussed, the output in a rectangular waveform remains at a high level while each even frame is displayed, and remains at a low level while each odd frame is displayed.

FIG. 8C illustrates an output of the image data analyzer 100. The image data analyzer 100 outputs a low signal while the even frames are left images and a high signal while the even frames are right images.

The output from the shutter drive signal output unit 601 illustrated in FIG. 8B and the output from the image data analyzer 100 illustrated in FIG. 8C are input to the signal inverter 602. The signal inverter 602 exclusive-OR gates the two input signals, thereby generating and supplying an exclusive OR (XOR) signal to the liquid-crystal shutter eyeglasses 630.

FIG. 8D illustrates the output signal generated and output by the signal inverter 602. The signal illustrated in FIG. 8D is the exclusive OR (XOR) gating result of the signals illustrated in FIGS. 8B and 8C. In view of the image display timing illustrated in FIG. 8A, the signal in FIG. 8D remains at a high level while the left image "LEFT" is displayed and at a low level while the right image "RIGHT" is displayed. The liquid-crystal shutter eyeglasses 630 operates in response to the signal illustrated in FIG. 8D, namely, the output of the liquid-crystal shutter controller 600. The left image displayed on the display 620 is incident on only the left eye of the user and the right image displayed on the display 620 is incident on only the right eye of the user. This control allows the user to view a correct stereoscopic image.

The left image and the right image are not correctly alternately displayed on the display 620. As illustrated in FIG. 8A, the two left images, one prior to timing t1 and the other subsequent to timing t1, may be consecutively displayed. In such a case, if the liquid-crystal shutter eyeglasses 630 is controlled only by the output of the shutter drive signal output unit 601 (FIG. 8B), the user wearing the liquid-crystal shutter eyeglasses 630 views the left image displayed on the display 620 with the right eye and the right image displayed on the display 620 with the left eye. No correct visual depth displaying can be achieved.

In accordance with the embodiment of the present invention, the image data analyzer 100 correctly determines the left image and the right image, and the output of the shutter drive signal output unit 601 is correctly updated in response to the determination results of the image data analyzer 100. Even prior to and subsequent to timing t1, the signal illustrated in FIG. 8D consistently remains at a high level while the left image "LEFT" is displayed on the display 620 and at a low level while the right image "RIGHT" is displayed on the display 620. The liquid-crystal shutter glasses 630 is controlled by the signal illustrated in FIG. 8D.

As a result, the liquid-crystal shutter eyeglasses 630 is correctly controlled so that the left image displayed on the display 620 is incident on only the left eye of the user and so that the right image displayed on the display 620 is incident on only the right eye of the user.

The analysis results of the left image and the right image provided by the image data analyzer 100 discussed with reference to FIGS. 1 through 6A and 6B may be used as a controller for a polarizer for stereoscopic image displaying.

Figure 9:
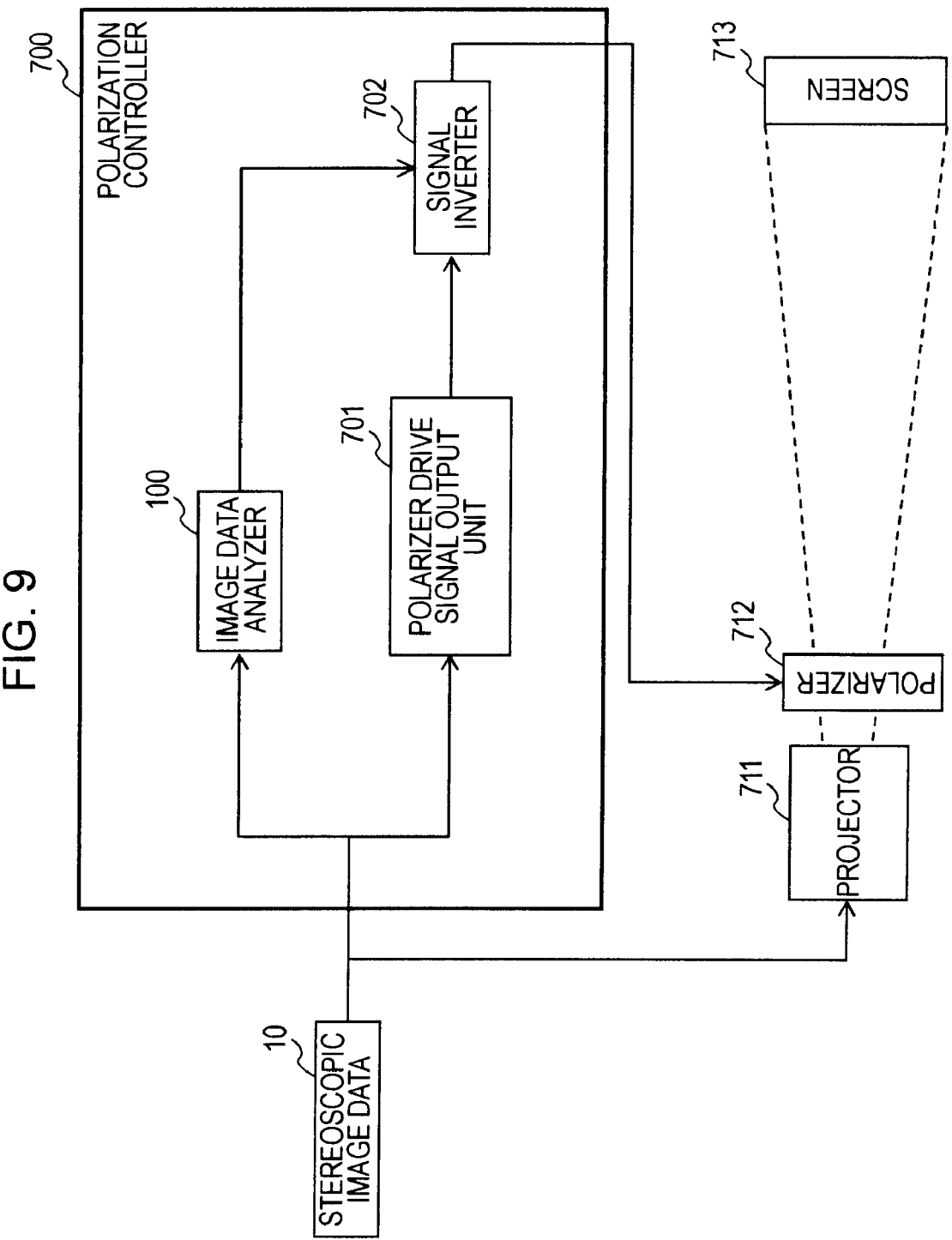
FIG. 9 illustrates a determination result of the left image and the right image by the image data analyzer, the determination result being used by a polarization controller that controls a polarizer.

FIG. 9 illustrates a polarization controller 700. The polarization controller 700 illustrated in FIG. 9 includes a polarizer drive signal output unit 701 and a signal inverter 702 in addition to the image data analyzer 100 previously discussed with reference to FIGS. 1 through 6A and 6B.

The stereoscopic image data 10 is time-division stereoscopic image data in which left images for the left eye and right images for the right eye alternately appear as different frames. The stereoscopic image data 10 is the same data as the data input to the image data analyzer 100 illustrated in FIG. 1. The stereoscopic image data 10 is input to the polarization controller 700 and a projector 711, and then displayed on a screen 713 via a polarizer 712.

The projector 711 may be a projector or a cinema projector. A projection light beam from the projector 711 incident on the polarizer 712 is right-handed circularly polarized or left-handed circularly polarized. The user wearing polarized glasses views an image projected on the screen 713. The polarized glasses include a polarizing filter. With the polarizing filter, the left section for the left eye of the polarized glasses permits a left-handed circularly polarized beam to pass therethrough, and the right section for the right eye of the polarized glasses permits a right-handed circularly polarized beam to pass therethrough.

The polarization controller 700 analyzes the stereoscopic image data 10, and determines whether the image currently projected by the projector 711 is a left image or a right image. The polarization controller 700 generates and outputs a control signal to the polarizer 712. The control signal controls the polarizer 712 so that the projection light beam is left-handed circularly polarized the projected left image and so that the projection light beam is right-handed circularly polarized in response to the projected right image.

The sequence of each signal is identical that of the liquid-crystal shutter controller 600 described with reference to FIGS. 8A-8D. The signal pattern of each element of the polarization controller 700 illustrated in FIG. 9 is described below with reference to FIGS. 8A-8D.

FIG. 8A illustrates a switching sequence of the image supplied to the projector 711. The label "LEFT" indicates a left image, and the label "RIGHT" indicates a right image. At timing t1, one left image is followed by another left image.

Prior to timing t1, each of the even frames is a left image and each of the odd images is a right image. Subsequent to timing t1, each of the even frames is switched to a right image and each of the odd images is switched to a left image.

FIG. 8B illustrates the output of the polarizer drive signal output unit 701. As previously discussed, the output in a rectangular waveform remains at a high level while each even frame is displayed, and remains at a low level while each odd frame is displayed.

FIG. 8C illustrates the output of the image data analyzer 100. The image data analyzer 100 outputs a low signal while the even frames are left images and a high signal while the even frames are right images.

The output from the polarizer drive signal output unit 701 illustrated in FIG. 8B and the output from the image data analyzer 100 illustrated in FIG. 8C are input to the signal inverter 702. The signal inverter 702 exclusive-OR gates the two input signals, thereby generating and supplying an exclusive OR (XOR) signal to the polarizer 712.

FIG. 8D illustrates the output signal generated by the signal inverter 702 and then input to the polarizer 712. The signal illustrated in FIG. 8D is the exclusive OR (XOR) gating result of the signals illustrated in FIGS. 8B and 8C. In view of the image switch timing of the image supplied to the projector 711 illustrated in FIG. 8A, the signal in FIG. 8D remains at a high level while the left image "LEFT" is supplied and displayed and at a low level while the right image "RIGHT" is supplied and displayed. The polarizer 712 operates in response to the signal illustrated in FIG. 8D, namely, the output of the polarization controller 700. The light beam is left-handed circularly polarized when the left image is projected, and right-handed circularly polarized when the right image is projected.

The left image projected on the screen 713 is correctly left-handed circularly polarized, and the user wearing the polarized glasses views the image through the left section of the glasses that permits only the left-handed circularly polarized light beam to pass therethrough. The right image projected on the screen 713 is correctly right-handed circularly polarized, and the user wearing the polarized glasses views the image through the right section of the glasses that permits only the right-handed circularly polarized light beam to pass therethrough. Under this control, the user views a correct stereoscopic image.

The stereoscopic image data 10 is not typically supplied to the projector 711 with the left image correctly alternating with the right image. For example as illustrated in FIG. 8A, the two left images, one prior to timing t1 and the other subsequent to timing t1, may be consecutively displayed. In such a case, if the polarizer 712 is controlled only by the output of the polarizer drive signal output unit 701 (FIG. 8B), the user views the left image displayed on the screen 713 with the right eye and the right image displayed on the screen 713 with the left eye subsequent to timing t1. No correct visual depth displaying is achieved.

In accordance with the embodiment of the present invention, the image data analyzer 100 correctly determines the left image and the right image, and the output of the polarizer drive signal output unit 701 is correctly updated in response to the determination results of the image data analyzer 100. Regardless of timing prior to or subsequent to t1, the signal illustrated in FIG. 8D consistently remains at a high level while the left image "LEFT" is displayed on the screen 713 and at a low level while the right image "RIGHT" is displayed on the screen 713. The output of the polarizer 712 is controlled by the signal illustrated in FIG. 8D in this way.

As a result, the left image displayed on the screen 713 is incident on only the left eye of the user and the right image displayed on the screen 713 is incident on only the right eye of the user. The user can thus view a correct stereoscopic image.

FIG. 9 illustrates the system in which the light beam from the projector 711 is projected onto the screen 713 and the user wearing the polarized glasses views the image on the screen 713.

Figure 10:
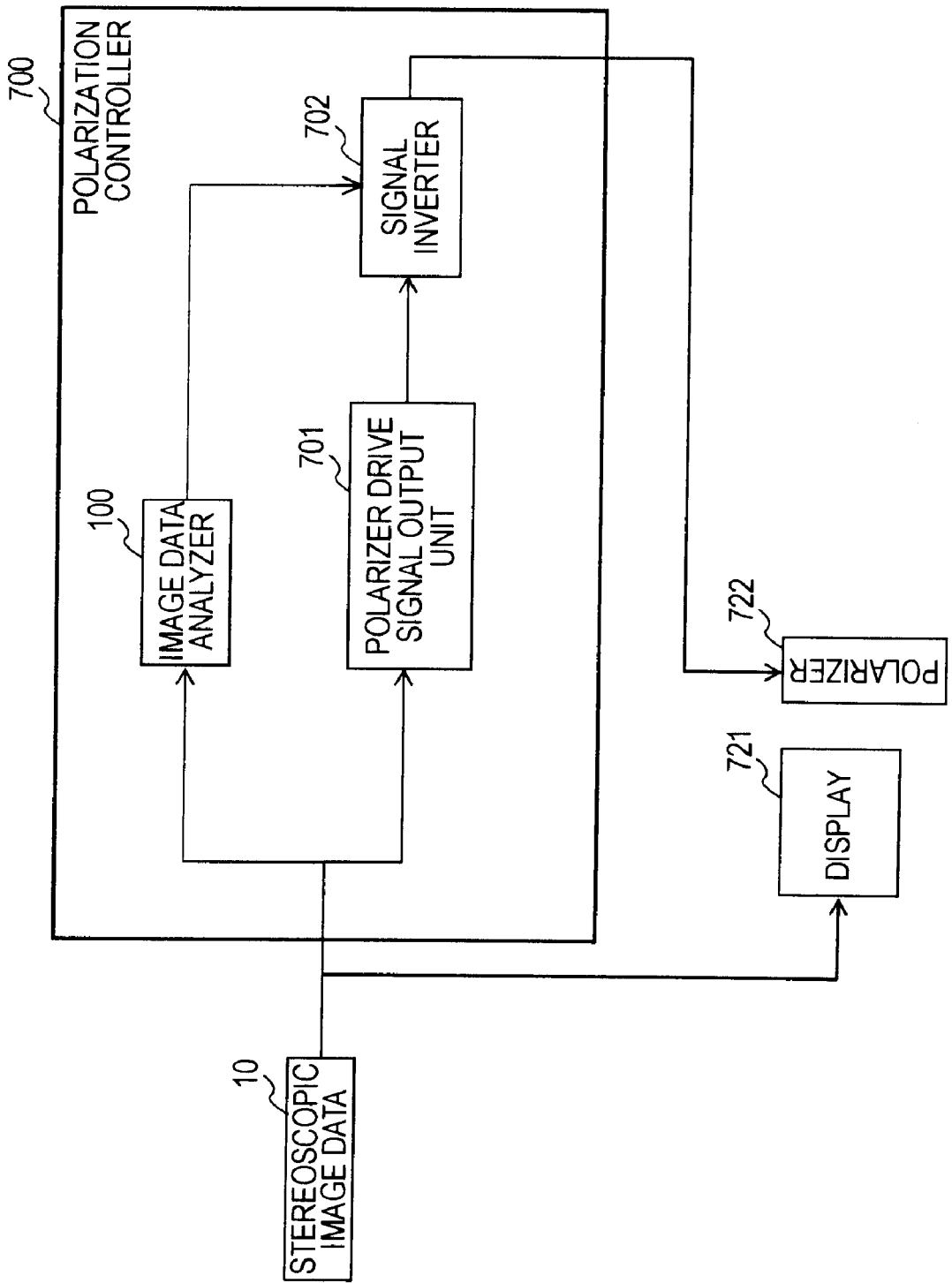
FIG. 10 illustrates a determination result of the left image and the right image by the image data analyzer, the determination result being used by the polarization controller that controls the polarizer.

FIG. 10 illustrates a polarization control type system different from the screen-projection type illustrated in FIG. 9. Referring to FIG. 10, the system includes a display 721. The display 721 is a television monitor or a personal computer monitor, for example. The display 721 displays the stereoscopic image data 10, i.e., displays alternately the left image and the right image.

A light beam from the display 721, incident on a polarizer 722, is right-handed circularly polarized or left-handed circularly polarized. The user wearing the polarized glasses views an image emitted from the display 721 and then transmitted through the polarizer 722. The polarized glasses include a polarizing filter. With the polarizing filter, the left section for the left eye of the polarized glasses permits a left-handed circularly polarized beam to pass therethrough, and the right section for the right eye of the polarized glasses permits a right-handed circularly polarized beam to pass therethrough.

A polarization control signal of the polarizer 722 is supplied from the polarization controller 700. The polarization controller 700 illustrated in FIG. 10 has the same structure as illustrated in FIG. 9. More specifically, the polarization controller 700 includes the polarizer drive signal output unit 701 and the signal inverter 702 in addition to the image data analyzer 100 previously discussed with reference to FIGS. 1 through 6A and 6B.

The signals generated in the polarization controller 700 are identical to those described with reference to FIGS. 8A-8D. More specifically, FIG. 8A illustrates the image switching sequence of the image supplied to the display 721. FIG. 8B illustrates the output of the polarizer drive signal output unit 701. FIG. 8C illustrates the output of the image data analyzer 100. FIG. 8D illustrates the signal output by the signal inverter 702 and then supplied to the polarizer 722.

The signal illustrated in FIG. 8D generated by the signal inverter 702 and supplied to the polarizer 722 is an exclusive OR gated signal of the output of the polarizer drive signal output unit 701 illustrated in FIG. 8B and the output of the image data analyzer 100 illustrated in FIG. 8C.

In view of the image switch timing of the image supplied to the display 721 illustrated in FIG. 8A, the signal in FIG. 8D remains at a high level while the left image "LEFT" is supplied and displayed and at a low level while the right image "RIGHT" is supplied and displayed. The polarizer 722 operates in response to the signal illustrated in FIG. 8D, namely, the output of the polarization controller 700. The light beam is left-handed circularly polarized when the left image is projected, and right-handed circularly polarized when the right image is projected.

The left image is correctly left-handed circularly polarized by the polarizer 722, and the user wearing the polarized glasses views the image through the left section of the glasses that permits only the left-handed circularly polarized light beam to pass therethrough to the left eye. The right image is correctly right-handed circularly polarized by the polarizer 722, and the user wearing the polarized glasses views the image through the right section of the glasses that permits only the right-handed circularly polarized light beam to pass therethrough to the right eye.

In accordance with the embodiment of the present invention, the image data analyzer 100 correctly determines the left image and the right image, and the output of the polarizer drive signal output unit 701 is correctly updated in response to the determination results of the image data analyzer 100. Regardless of timing prior to or subsequent to t1, the signal illustrated in FIG. 8D consistently remains at a high level while the left image "LEFT" is displayed and at a low level while the right image "RIGHT" is displayed. The polarizer 722 is controlled by the signal illustrated in FIG. 8D. As a result, the left image displayed on the display 721 is incident on only the left eye of the user and the right image displayed on the display 721 is incident on only the right eye of the user. Under this control, the user can view a correct stereoscopic image.

The above series of process steps may be executed using hardware or software or a combination thereof. If the series of process steps are executed using software, a program of the process steps may be installed onto a memory in a computer contained in a host hardware structure for execution. Alternatively, for program execution, the program may be installed onto a general-purpose computer that executes a variety of processes. The program may be pre-stored on a recording medium. The program may then be installed from the recording medium to the computer. Alternatively, the program may be received via a network such as a local area network (LAN) or the Internet, and installed onto a recording medium such as an internal hard disk in the computer.

The program of the computer may be executed in the time-series order of the process steps described in this specification, or may be executed in parallel or may be executed at any timing. The word system in the context of this specification is intended to mean a logical set of a plurality of apparatuses, and is not limited to a single housing unit in which a variety of elements are integrated.

The present application contains subject matter related to that disclosed in Japanese Priority Patent Application JP 2008-231181 filed in the Japan Patent Office on Sep. 9, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image data analyzing apparatus, comprising:
a monocular visual depth information determiner for receiving stereoscopic image data of time-division display type composed of a left image for a left eye of a user and a right image for a right eye of the user, and determining a first anteroposterior relationship of regions contained in an image frame of one of the left image and the right image;
a binocular visual depth information determiner for receiving the stereoscopic image data of time-division display type, selecting an image assumed to be the left image and an image assumed to be the right image, and determining a second anteroposterior relationship of regions contained in an image frame of a plurality of images containing the selected left image and right image; and
a left-right image discriminator for receiving a first determination result relating to the first anteroposterior relationship from the monocular visual depth information determiner, and a second determination result relating to the second anteroposterior relationship from the binocular visual depth information determiner, comparing the first determination result with the second determination result, determining that an assumption set by the binocular visual depth information determiner is correct if a rate of agreement between the first determination result of the monocular visual depth information determiner and the second determination result of the binocular visual depth information determiner is equal to or higher than a predetermined threshold value, and outputting identification information representing whether each image frame of the stereoscopic image data is the left image or the right image as identification information in agreement with the assumption.

2. The image data analyzing apparatus according to claim 1, wherein the left-right image discriminator determines that the assumption set by the binocular visual depth information determiner is incorrect if the rate of agreement between the first determination result of the monocular visual depth information determiner and the second determination result of the binocular visual depth information determiner is lower than the predetermined threshold value, and outputs the identification information representing whether each image frame of the stereoscopic image data is the left image or the right image as identification information in agreement with a reverse setting of the assumption.

3. The image data analyzing apparatus according to claim 1, wherein each of the monocular visual depth information determiner and the binocular visual depth information determiner generates a plurality of determination results relating to a plurality of regions,
wherein the left-right image discriminator receives and compares a plurality of first determination results of the monocular visual depth information determiner and a plurality of second determination results of the binocular visual depth information determiner, determines that the assumption set by the binocular visual depth information determiner is correct if the rate of agreement is equal to or higher than the predetermined threshold value, and outputs identification information representing whether each image frame of the stereoscopic image data is the left image or the right image as identification information in agreement with the assumption, and determines that the assumption set by the binocular visual depth information determiner is incorrect if the rate of agreement is lower than the predetermined threshold value, and outputs the identification information representing whether each image frame of the stereoscopic image data is the left image or the right image as identification information matching an inverted setting of the assumption.

4. The image data analyzing apparatus according to claim 1, wherein the binocular visual depth information determiner divides image frames of the stereoscopic image data of time-division display type into an even frame and an odd frame, sets up a first assumption that the even frame is the left image and that the odd frame is the right image, or an assumption reverse to the first assumption, and determines under the set assumption the second anteroposterior relationship of regions contained in an image frame of the plurality of images containing the left image and the right image.

5. The image data analyzing apparatus according to claim 1, wherein the binocular visual depth information determiner performs a stereomatching process on the plurality of images containing the selected left image and right image in order to determine the second anteroposterior relationship of regions contained in the image frame of the plurality of images containing the selected left image and right image.

6. The image data analyzing apparatus according to claim 1, wherein the monocular visual depth information determiner determines the first anteroposterior relationship of regions contained in the image frame from an image blur of the regions or a vertical positional relationship of the regions contained in the image frame of one of the left image and the right image.

7. The image data analyzing apparatus according to claim 1, wherein the monocular visual depth information determiner determines the first anteroposterior relationship of two regions by detecting an overlap between the two regions through tracking the two regions moving on a plurality of left images or right images.

8. A liquid-crystal shutter control apparatus, comprising:

a monocular visual depth information determiner for receiving stereoscopic image data of time-division display type composed of a left image for a left eye of a user and a right image for a right eye of the user, and determining a first anteroposterior relationship of regions contained in an image frame of one of the left image and the right image;

a binocular visual depth information determiner for receiving the stereoscopic image data of time-division display type, selecting an image assumed to be the left image and an image assumed to be the right image, and determining a second anteroposterior relationship of regions contained in an image frame of a plurality of images containing the selected left image and right image;

a left-right image discriminator for receiving a first determination result relating to the first anteroposterior relationship from the monocular visual depth information determiner, and a second determination result relating to the second anteroposterior relationship from the binocular visual depth information determiner, comparing the first determination result with the second determination result, determining that an assumption set by the binocular visual depth information determiner is correct if a rate of agreement between the first determination result of the monocular visual depth information determiner and the second determination result of the binocular visual depth information determiner is equal to or higher than a predetermined threshold value, and outputting identification information representing whether each image frame of the stereoscopic image data is the left image or the right image as identification information in agreement with the assumption;

a shutter drive signal output unit for outputting a shutter drive signal driving liquid-crystal shutter eyeglasses that are switched by image frames forming the stereoscopic image data; and a signal inverter for receiving an identification signal output from the left-right image discriminator, and the shutter drive signal output from the shutter drive signal output unit, modifying the shutter drive signal in response to the identification signal and outputting modified shutter drive signal as a control signal to the liquid-crystal shutter eyeglasses.

9. The liquid-crystal shutter control apparatus according to claim 8, wherein the signal inverter exclusive OR gates the identification signal output from the left-right image discriminator and the shutter drive signal output from the shutter drive signal output unit, and outputs exclusive OR gate results as the control signal to the liquid-crystal shutter eyeglasses.

10. A polarization control apparatus, comprising:

a monocular visual depth information determiner for receiving stereoscopic image data of time-division display type composed of a left image for a left eye of a user and a right image for a right eye of the user, and determining a first anteroposterior relationship of regions contained in an image frame of one of the left image and the right image;

a binocular visual depth information determiner for receiving the stereoscopic image data of time-division display type, selecting an image assumed to be the left image and an image assumed to be the right image, and determining a second anteroposterior relationship of regions contained in an image frame of a plurality of images containing the selected left image and right image;

a left-right image discriminator for receiving a first determination result relating to the first anteroposterior relationship from the monocular visual depth information determiner, and a second determination result relating to the second anteroposterior relationship from the binocular visual depth information determiner, comparing the first determination result with the second determination result, determining that an assumption set by the binocular visual depth information determiner is correct if a rate of agreement between the first determination result of the monocular visual depth information determiner and the second determination result of the binocular visual depth information determiner is equal to or higher than a predetermined threshold value, and outputting identification information representing whether each image frame of the stereoscopic image data is the left image or the right image as identification information in agreement with the assumption;

a polarizer drive signal output unit for outputting a polarizer drive signal driving a polarizer that is switched by image frames forming the stereoscopic image data; and a signal inverter for receiving an identification signal output from the left-right image discriminator, and the polarizer drive signal output from the polarizer drive signal output unit, modifying the polarizer drive signal in response to the identification signal and outputting modified polarizer drive signal as a control signal to the polarizer.

11. The polarization control apparatus according to claim 10, wherein the signal inverter exclusive OR gates the identification signal output from the left-right image discriminator and the polarizer drive signal output from the polarizer drive signal output unit, and outputs exclusive OR gate results as the control signal to the polarizer.

12. An image data analyzing method, comprising the steps of:

receiving stereoscopic image data of time-division display type composed of a left image for a left eye of a user and a right image for a right eye of the user, and determining in a first determination a first anteroposterior relationship of regions contained in an image frame of one of the left image and the right image;

receiving the stereoscopic image data of time-division display type, selecting an image assumed to be the left image and an image assumed to be the right image, and determining in a second determination a second anteroposterior relationship of regions contained in an image frame of a plurality of images containing the selected left image and right image; and receiving a first determination result of the first determination relating to the first anteroposterior relationship, and a second determination result of the second determination relating to the second anteroposterior relationship, comparing the first determination result with the second determination result, determining that an assumption set in the second determination is correct if a rate of agreement between the first determination result and the second determination result is equal to or higher than a predetermined threshold value, and outputting identification information representing whether each image frame of the stereoscopic image data is the left image or the right image as identification information in agreement with the assumption.

13. A non-transitory computer-readable storage medium encoded with a computer program for causing a computer to execute an image analysis process, the image analysis process comprising the steps of:

receiving stereoscopic image data of time-division display type composed of a left image for a left eye of a user and a right image for a right eye of the user, and determining in a first determination a first anteroposterior relationship of regions contained in an image frame of one of the left image and the right image;

receiving the stereoscopic image data of time-division display type, selecting an image assumed to be the left image and an image assumed to be the right image, and determining in a second determination a second anteroposterior relationship of regions contained in an image frame of a plurality of images containing the selected left image and right image; and receiving a first determination result of the first determination relating to the first anteroposterior relationship, and a second determination result of the second determination relating to the second anteroposterior relationship, comparing the first determination result with the second determination result, determining that an assumption set in the second determination is correct if a rate of agreement between the first determination result and the second determination result is equal to or higher than a predetermined threshold value, and outputting identification information representing whether each image frame of the stereoscopic image data is the left image or the right image as identification information in agreement with the assumption.

\* \* \* \* \*